US012428286B2

(12) United States Patent
Nini

(10) Patent No.: US 12,428,286 B2
(45) Date of Patent: Sep. 30, 2025

(54) ANTI-TAMPERING LIQUID DISPENSING TAP BY OPENING AN INTEGRATED AND MANUALLY BOUND ANTI-COUNTERFEIT SEAL

(71) Applicant: VITOP MOULDING S.R.L., Alessandria (IT)

(72) Inventor: Diego Nini, Alessandria (IT)

(73) Assignee: VITOP MOULDING S.R.L., Alessandria (IT)

( * ) Notice: Subject to any disclaimer, the term of this patent is extended or adjusted under 35 U.S.C. 154(b) by 0 days.

(21) Appl. No.: 18/681,964

(22) PCT Filed: Aug. 8, 2022

(86) PCT No.: PCT/IT2022/050224
§ 371 (c)(1),
(2) Date: Feb. 7, 2024

(87) PCT Pub. No.: WO2023/047428
PCT Pub. Date: Mar. 30, 2023

(65) Prior Publication Data

US 2025/0115469 A1 Apr. 10, 2025

(30) Foreign Application Priority Data

Sep. 21, 2021 (IT) ........................ 102021000024128

(51) Int. Cl.
*B67D 3/00* (2006.01)
*B67D 3/04* (2006.01)

(52) U.S. Cl.
CPC ........... *B67D 3/0074* (2013.01); *B67D 3/043* (2013.01)

(58) Field of Classification Search
CPC .............................. B67D 3/0074; B67D 3/043
See application file for complete search history.

(56) References Cited

U.S. PATENT DOCUMENTS 11,878,903 B2 * 1/2024 Koo ........................ B67D 3/043
2013/0285364 A1 * 10/2013 Johnson ................ F16L 41/021 285/8
2019/0113151 A1 4/2019 Moon
2019/0337792 A1 * 11/2019 Nini ........................ B67D 3/043
2022/0041426 A1 * 2/2022 Nini ........................ B67D 3/043

FOREIGN PATENT DOCUMENTS

WO WO-9735802 A1 * 10/1997 ............ F16K 21/14
WO 2021111480 A1 6/2021

OTHER PUBLICATIONS

Machine Translation of WO-9735802-A1.*
Nov. 30, 2022 International Search Report.
Nov. 30, 2022 Written Opinion of the International Searching Authority.

* cited by examiner

*Primary Examiner* — Jeremy Carroll
(74) *Attorney, Agent, or Firm* — Whitestone Law, PLLC

(57) ABSTRACT

Some embodiments relate to a liquid dispensing tap, comprising: a containment body; an internal valve or elastic dome membrane contained within the body; a driving element partially contained within the body and operatively coupled to the internal valve or membrane to enable/disable a supply of liquid from the tap; and a cap placed above the body to cover the tap, the cap being composed of a main body equipped with a movable seal with automatic opening fixed to the fixed main body due to hinges and jumpers/teeth.

7 Claims, 47 Drawing Sheets

ANTI-TAMPERING LIQUID DISPENSING TAP BY OPENING AN INTEGRATED AND MANUALLY BOUND ANTI-COUNTERFEIT SEAL

CROSS-REFERENCE TO RELATED APPLICATIONS

This application is a national phase filing under 35 C.F.R. § 371 of and claims priority to PCT Patent Application No. PCT/IT2022/050224, filed on Aug. 8, 2022, which claims the priority benefit under 35 U.S.C. § 119 of Italian Application No. 102021000024128, filed on, Sep. 21, 2021.

SUMMARY

The present invention relates to a tap for dispensing liquids from containers, in particular and preferably the so-called "bag-in-box" containers (hereinafter referred to as BIB).

In particular, the present invention refers to dispensing taps, preferably for BIB systems with opening, which allows the dispensing of fluids contained inside the container (preferably BIB), made by means of a driving element with protruding fins, on which it is possible to apply a lifting force, preferably transmitted by the index and ring fingers, resting on the lower external surfaces of the fins protruding from the dispensing tap and compensated by the opposable thumb placed in the opposite position to the lifting effort, as shown in FIG. 35.

In particular, the new inventive tap must have an anti-counterfeiting or anti-tampering ("tamper-evident") system with a rupture band, which remains bound to the tap without being dispersed into the environment, as required by the new European and international directives on articles of disposable plastic (SUP), thus enabling their recovery and recycling.

The inventive tap must also have geometries that will enable a perfect sealing and will rest on the new tamper-evident band when the tap is in its closed position and with the tamper-evident seal still inviolate. In particular, the driving element, on which geometries are obtained that enable the perfect functioning of the tamper-evident seal when it is in its closed position, must be constrained to an elastic element, positioned inside the body of the inventive tap, which is specifically designed to be used "in common" with all new versions of the hood and also with the hood currently on the market, enabling the use and production of a single component in common with all potentially producible versions, which determines opening (due to the traction force impressed on the driving element to which it is bound) and self-closing (due to the elastic characteristics of the material and the special dome geometry).

In particular, the tap of the present invention can be considered a technological innovation of a known version currently on the market and which is protected by patent EP-A1-0432070.

This well-known dispensing tap, while functioning completely effectively, fails, maintaining the current conformation, to comply with the new European and international directives on disposable plastic items (SUP), as it is equipped with a removable band guarantee seal, which in fact detaches and which, if not properly disposed of, would be dispersed in the environment.

The configuration of the dispensing tap currently on the market consists of four elements: a first cap 2A, a first operating element 3A, an internal valve or membrane 5 and a first body 4A, as shown in FIGS. 16, 17, 18, 19. FIG. 16 shows the tap currently on the market in its closed position, with the tamper-evident seal still intact, highlighting the fact that the system, preferably BIB, has not yet been opened to guarantee the end consumer. Once the tamper-evident band has been removed, as shown in FIG. 34, the tap is ready to be opened for the first time, as shown in the images in FIGS. 20, 21, 22 and 23. In this phase, the tamper-evident band 2A2 of the first cap 2A of FIGS. 16, 17, 18 and 19 must be disposed of (correctly or not, and in any case even if disposed of correctly, due to its small size, it would not be recycled properly but would end up in the undifferentiated waste: this is what makes the current application on the market non-compliant with the new European and international directives on disposable plastic items (SUP)) and then one can proceed with the first opening, as shown in FIG. 35.

Preferably, as shown in FIGS. 23, 24, 25 and 26, where the tap currently on the market can be seen in its open position to allow the dispensing of fluids from containers, the opening force is transmitted to the internal sealing elements (internal valve or dome membrane) 5 of FIG. 31, also represented, as regards the version currently on the market, in FIGS. 17, 18 and 25, in which the first operating element 3A of FIG. 18 with the fins 3A1 of FIG. 27 is stably connected, by means of its coupling end 3A2, to the coupling cavity 5.4 (FIG. 21) obtained inside the internal valve or elastic membrane 5.

The internal valve or membrane 5 will also and above all have the purpose of coupling stably and hermetically with the body 4A shown in FIG. 29, as regards the configuration currently on the market, using the internal wall 4A.4 and the internal groove 4A.7 of FIG. 29. The internal valve or membrane 5 is locked in the right position and above all resists the stresses it receives on the first operating element 3A of FIG. 27 during the opening phases of the tap 1, transmitted as described above by the opening force imposed on the surfaces 3A1 of the external fins, due to the internal geometries 2A4 of the first cap 2A stably bound in turn to the first body 4A of FIG. 29 by means of ultrasonic welding, specifically in this case of the prior art tap present on the market. The description of the tap 1A currently on the market is contained in document EP-A1-0432070 mentioned above, which can be considered the progenitor as regards automatic closing liquid dispensers.

With reference to FIG. 17, the integrated tamper-evident 2A2 removable band seal 2A is shown, with opening by means of the first operating element 3A connected through the geometry 3A2 of FIG. 32 to the internal valve or dome-shaped elastic membrane 5 by means of the cavity 5.4 of FIG. 31, which also allows self-closing, due to its elastic and geometric properties, once the tabs 3A1 of the first operating element 3A of FIG. 27 have been released.

In particular, with reference to FIGS. 15 to 26, they show the transition from the latest version currently marketed all over the world of the dispensing prior art tap, to a dispensing tap 1A made entirely of plastic material formed by a first body 4A of FIG. 29.

In particular, it is formed, referring to FIG. 29, by an elongated rear area 1A BACK on which the connection element 4A.6 and the anti-removal sharp-edged element 4A.5 are made, which stably couple with a sharp-edged geometry present on the nozzle for connection to the bag (in the case of the BIB version), not shown. On the tap 1A it is also possible to highlight, with reference to FIG. 19 or 29, the front part 1A FRONT whose front cylinder is placed perpendicular to 1A BACK, which acts as the main seat on which they are assembled, as shown in FIGS. 17 and 18, the internal valve or elastic dome membrane 5, made of flexible elastomeric material, a first operating element 3A linked to the internal valve or flexible elastic dome membrane 5 by means of a mechanical coupling with coupling end and coupling cavity (3A2-5.4), and a first cap 2A with removable seal 2A2. In particular, referring to FIG. 25, the internal valve or flexible elastic dome membrane 5 is the "heart" of the dispensing system which actually gives "life" to the dispensing tap since, based on its position determined by the position of the first operating element 3A to which it is stably bound and to which traction can be applied or not on the external fins, determines the opening and closing of the tap.

Furthermore, the internal valve or elastic dome membrane 5, as shown in FIG. 18, determines the perfect seal against liquids of the tap itself, interfering with the internal surfaces of the body, as shown in FIG. 18, where there are elements of upper seal 4A.3—sealing circumference 5.1 and the lower sealing elements (on the liquid outlet hole) internal wall 4A. 4—external vertical sealing wall 5.3 of the valve or elastic dome membrane 5A on the body 4A.

Furthermore, the internal valve or elastic dome membrane 5 acts as a "spring" which allows the closing or opening of the liquid delivery hole, as shown in FIG. 25. Again, the main peculiarity of the internal valve or membrane elastic dome with spring 5 allows the automatic closing of the tap 1A once the fins of the first operating element 3A are released, and therefore no action is applied to them anymore. To better specify, the first operating element 3A is stably bound to the internal valve or elastic dome membrane 5 by means of the coupling end 3A2. The first operating element 3A has the purpose of allowing the end user to be able to open and close the outlet hole of the liquid, carrying out, with the index finger and the middle or ring finger, a traction on the fins (compensated by the opposable thumb finger which instead will create a pressure on the upper cap 2A on the specially made central seat), as shown in FIG. 30, and to allow the tip of the internal valve or spring-loaded elastic dome membrane 5 to be able to free or close the liquid outlet hole.

Furthermore, the dome valve receives the thrust necessary to keep the tap perfectly closed (therefore a sort of spring pre-load) from the internal thrust element 2A.4 of FIG. 28 of the particular first cap 2A also shown in FIG. 28, which is the final component assembled on the first body 4A which, in this currently produced version, is welded to the first body 4A by means of an ultrasonic welding.

The first cap 2A is stably constrained to the first body 4A, preferably by means of an ultrasonic welding but, with the necessary modifications, it is also possible to constrain the two components stably by means of joints (not shown), or with more modern and fast welding methods, such as laser welding. In particular, the first cap 2A with removable tamper-evident band 2A2 of FIG. 17 has the property of highlighting any use and/or tampering to the end customer. Furthermore, the tamper-evident band 2A2 guarantees the hermetic closure of the tap 1A from the producer to the consumer, as it blocks the vertical movement of the fins due to the possible traction force imposed by the fingers, as better highlighted in FIGS. 34 and 35.

In particular, before opening the tap 1A for the first time, the user must remove the tamper-evident band 2A2 from the tap 1A itself, as shown in FIG. 34. In this way, the tamper-evident band 2A2 completely detaches from the tap 1A and it becomes a piece in itself to be disposed of separately from the rest of the packaging.

Document WO-A1-97/35802 describes a dispensing tap according to the preamble of claim 1.

The prerogative of the present invention is to create a dispensing cap that allows having a tamper-evident system that can be integrated on the current tap without upsetting the current production systems of the tap itself, with a guarantee seal in compliance with the new European and international directives on disposable plastic items (SUP), and therefore that it remains bound to the tap after opening and does not disperse in the environment, or is disposed of incorrectly, allowing it to be recycled correctly, and that it adapts to the connection systems available on the market.

Object of the present invention is therefore being able to maintain the tamper-evident band 2A2 of the component of the first cap 2A of FIG. 17, replacing it with an innovative component which allows achieving the same purpose as the component 2A produced today, i.e. the protection of the product contained in the container, preferably BIB, and give evidence to the customer of any tampering, but by modifying the 2A2 band, which today is removed and could potentially be dispersed into the environment if not properly disposed of as suggested.

Object of the present invention is also providing a system for hooking the new cap which allows the new body 4 of FIG. 30 to be used in common for all versions produced or potentially producible.

Object of the present invention is also obtaining a body 4 (FIG. 30) on which the hooking slots of the new cap and also of the known cap are made, naturally making the necessary changes to the coupling of the known cap.

Object of the present invention is also using the body 4 also for the realization of the tap 4A produced today (FIG. 17), thus optimizing the production of this component and emphasizing even more the "green" aspect of these solutions, also with respect to the one already on the market.

In particular, the cap 2 of FIG. 1 must be designed to meet the requirements of the new European regulation called "Disposable plastic" (SUP), recently adopted by the European Parliament, as well as, for example, the AB 319 California regulation in United States. Both regulations aim to increase the amount of plastic collected and recycled, thereby reducing marine litter. As a result, Consumer Packaged Goods, CPG, Companies have called on their partners to develop solutions that not only comply with new regulations, but also provide environmentally conscious consumers with solutions that fit their lifestyle and provide them with the best packaging experience.

Referring to these new market needs, the Applicant has developed a new hood with integrated guarantee seal, shown in FIG. 33, which has been designed to promote post-use recycling, since the bands, preferably lateral (but can also be placed front or rear with modifications to the cap and to the driving element, but always falling within the teaching of this Application) will no longer detach from the tap, as is the case today, but will remain constrained to it, allowing the closure to pass through the correct recycling flow.

Another object of the present invention is finding a geometry that allows offering on the market a tap similar to the one marketed up to now so as not to require the end customer to change his way of use. As will be seen in more detail below, the new faucet more or less maintains the main (and historical) aesthetic characteristics of the faucet on the market today that have always distinguished it, integrating and modifying the general geometries of the cap in order to obtain a new bound opening system.

Another object of the present invention is creating a faucet that is completely made of plastic material (therefore easily recyclable) and that adapts to the connector systems studied ad hoc for this dispensing faucet present on the market today, effectively replacing the version 1A of the known faucet without going to upset the existing production cycles, and therefore not having to invest a lot of money for the "green" change made.

The aforementioned and other objects and advantages of the invention, which will emerge from the following description, are achieved with a dispensing tap as claimed in the independent claim. Preferred embodiments and non-trivial variants of the present invention are the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

BRIEF DESCRIPTION OF THE FIGURES

The present invention will be better described by some preferred embodiments thereof, provided by way of non-limiting example, with reference to the attached drawings, in which:

FIG. 20 is a perspective view of the tap according to the prior art in its closed position and with the removable band seal removed and disposed of;

FIG. 21 is a front view of the tap according to the prior art in its closed position and with the removable band seal removed and disposed of;

FIG. 22 is a side view of the tap according to the prior art in its closed position and with the removable band seal removed and disposed of;

DETAILED DESCRIPTION OF THE EMBODIMENTS

Figure 30:
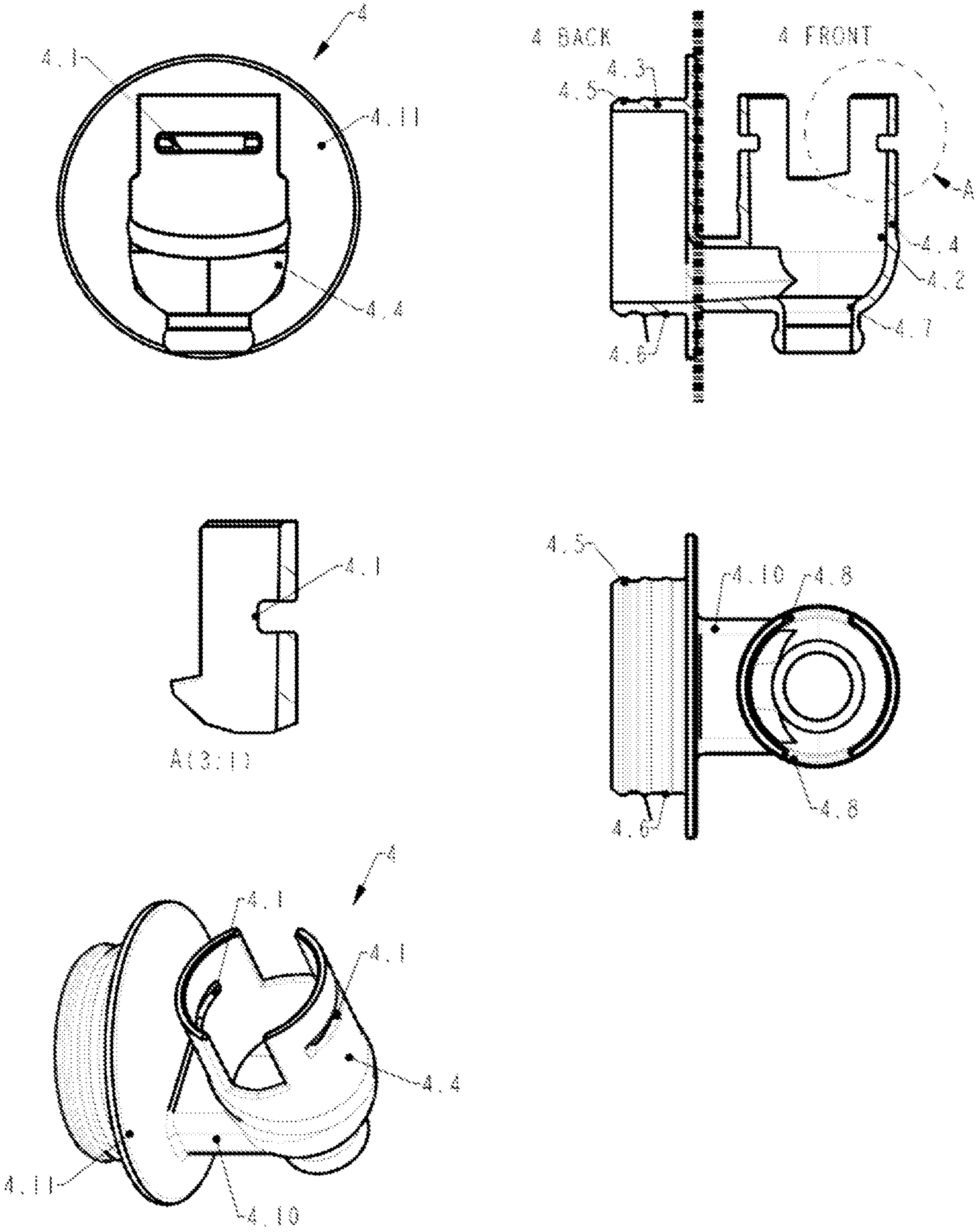
FIG. 30 is a cross-sectional front side isometric view of the body component of the future version shaped with front and rear slots/holes obtained on the body for the cap (in the version with mechanical hooks)

With reference to the Figures, an exemplary and non-limiting embodiment of the dispensing tap 1, 1A, and of the variants 1B and 1C adapted to the new universal body 4 of FIG. 30 is described (the variant 1C demonstrating the possible chance of using the body 4 of FIG. 30 also for the version currently on the market without problems, demonstrating its absolute universality).

It is evident to a skilled person in the art that the described tap can be made in shapes, sizes and with equivalent details, and can be used for containers of various types, for example those so-called “Bag-in-Box”, but also those rigid or semi-rigid containers and the like.

Figure 1:
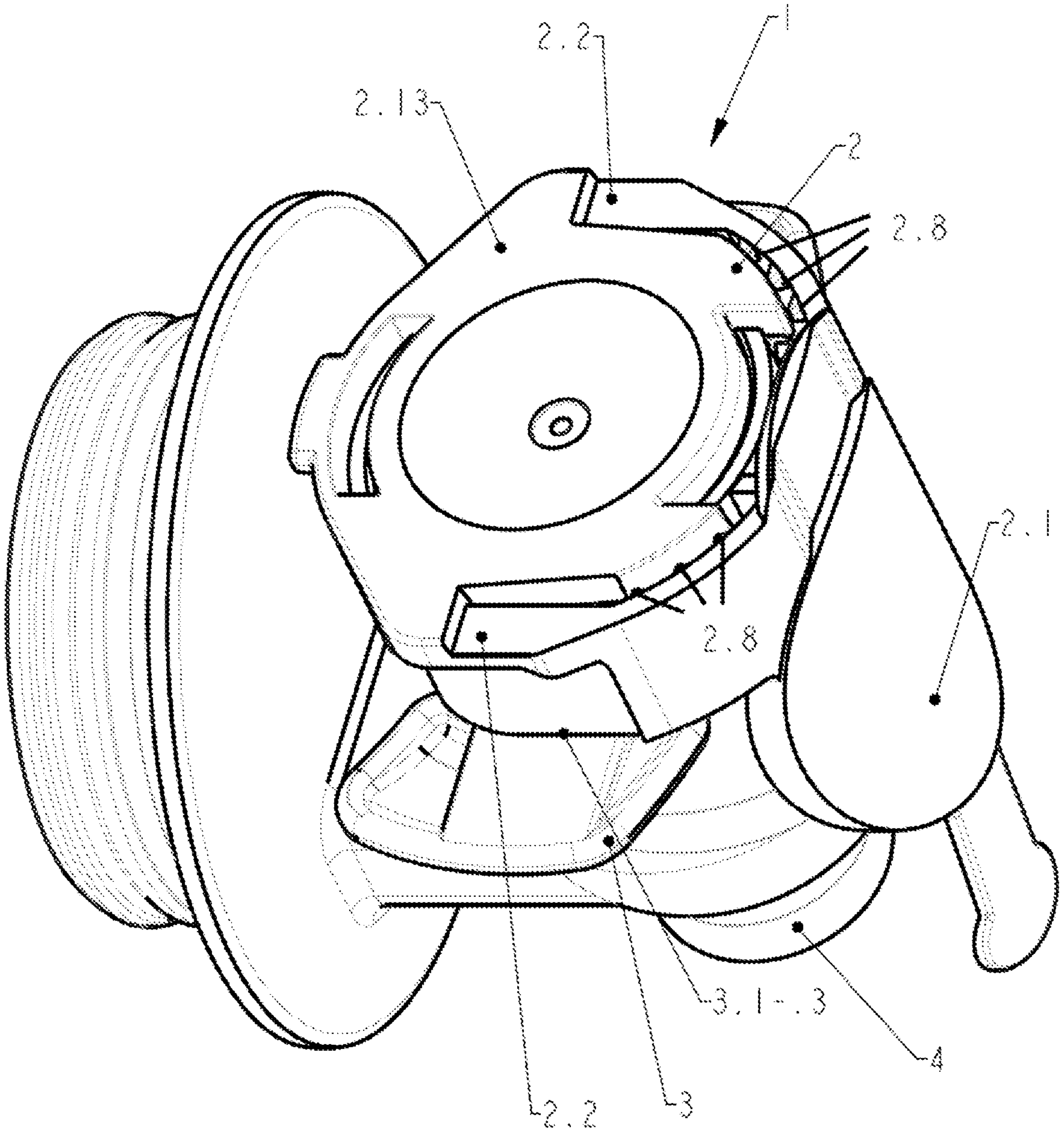
FIG. 1 is a perspective view of an embodiment of the tap according to the present invention in its closed position.
Figure 2:
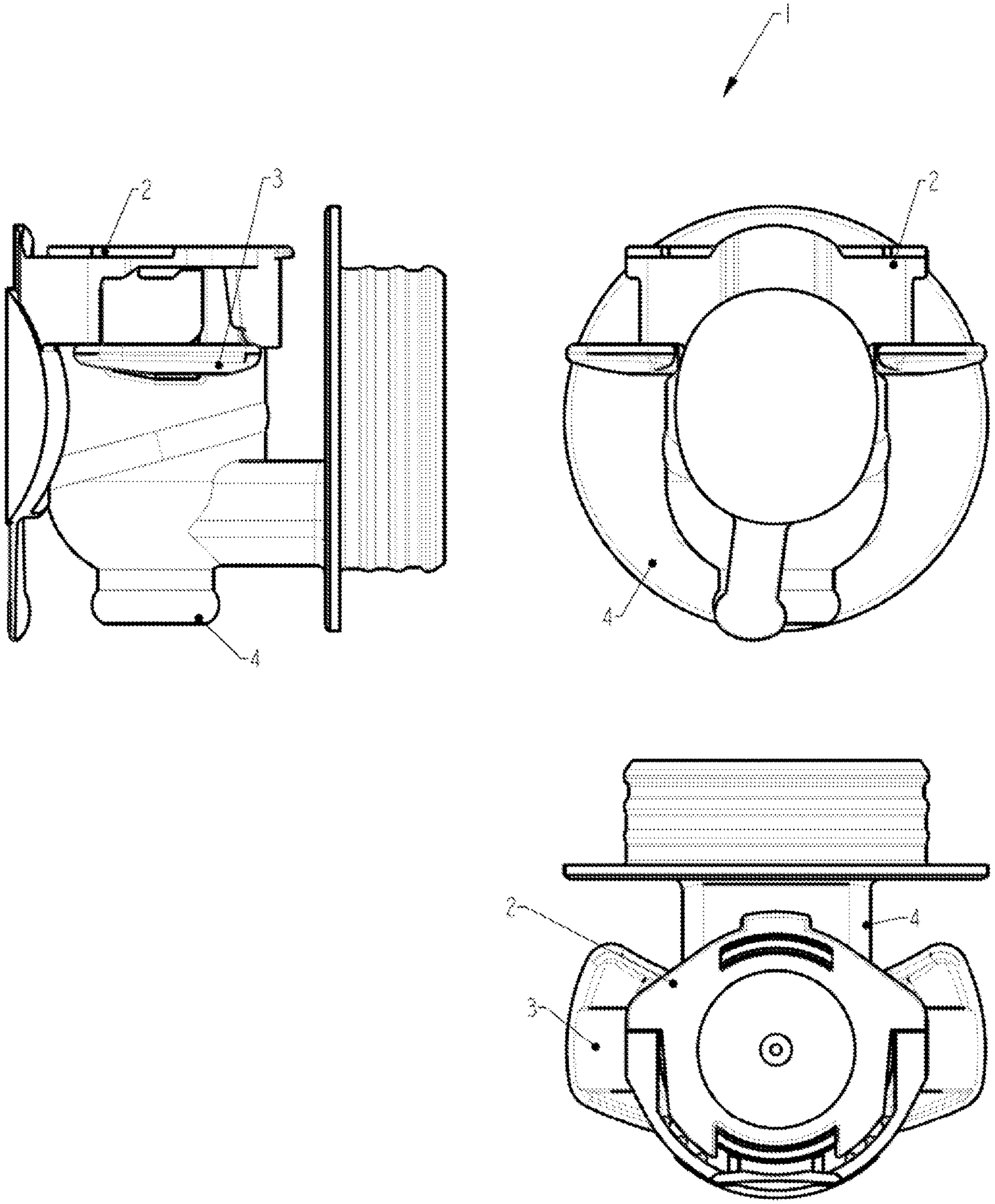
FIG. 2 is a front, side and top view of an embodiment of the tap according to the present invention in its closed position.
Figure 3:
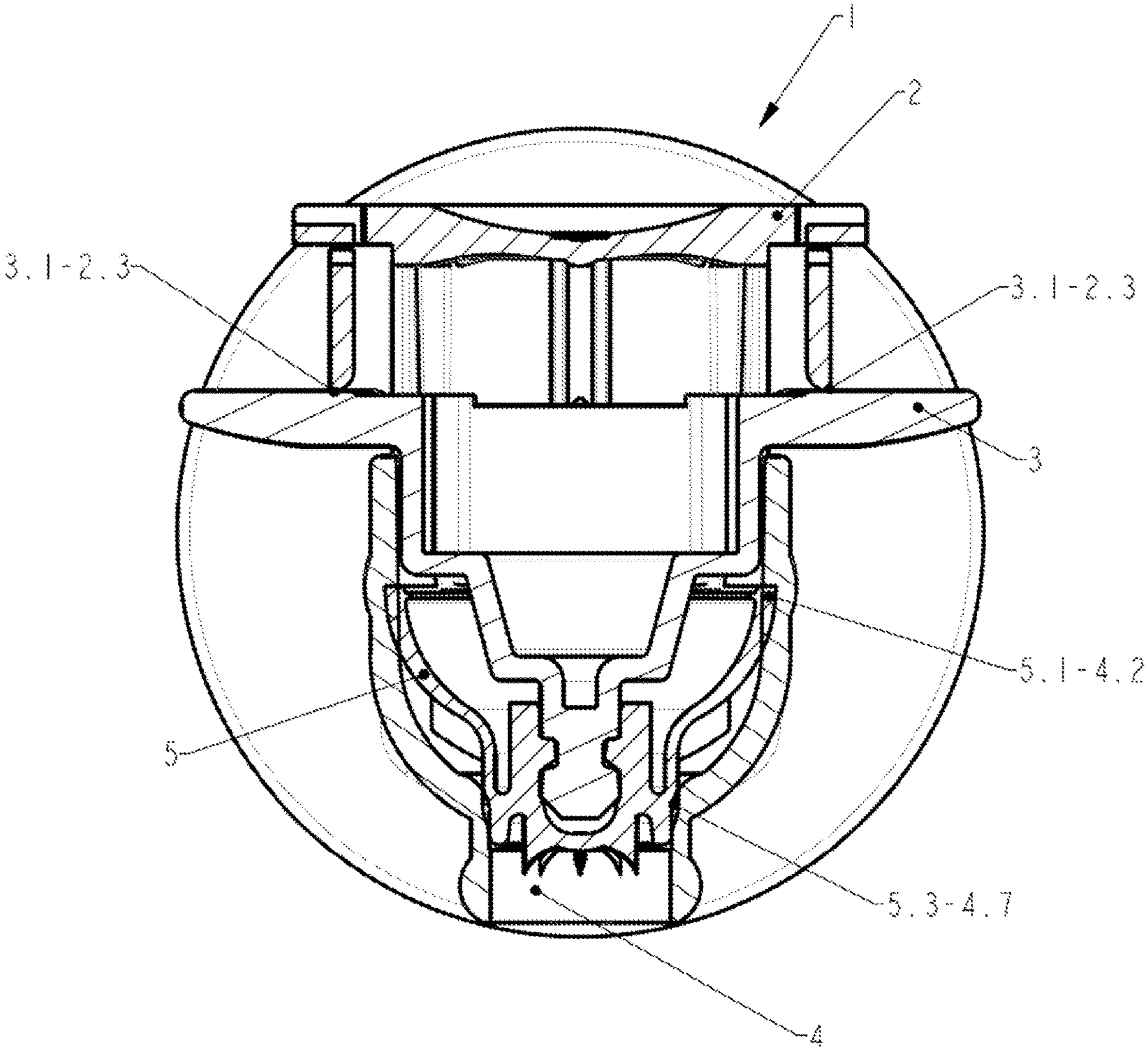
FIG. 3 is a sectional front view of an embodiment of the assembled tap according to the present invention in its closed position.
Figure 15:
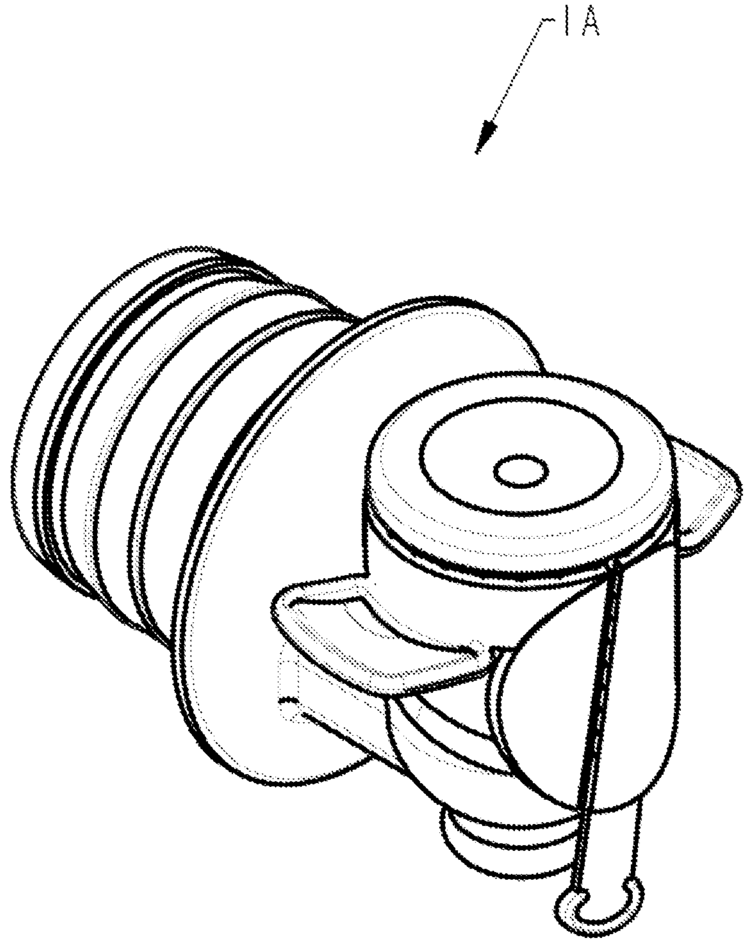
FIG. 15 is a perspective view of the tap according to the prior art.
Figure 16:
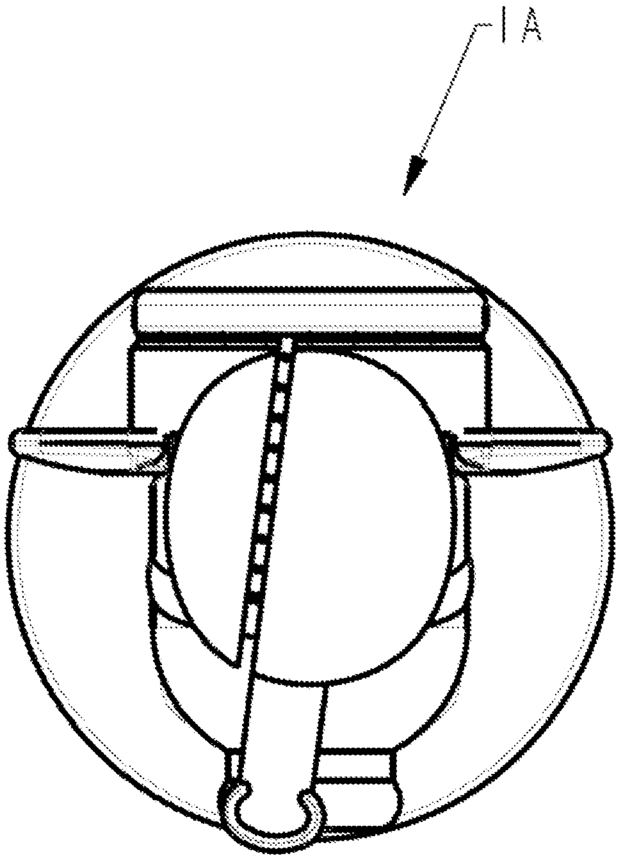
FIG. 16 is a front view of the tap according to the prior art.
Figure 17:
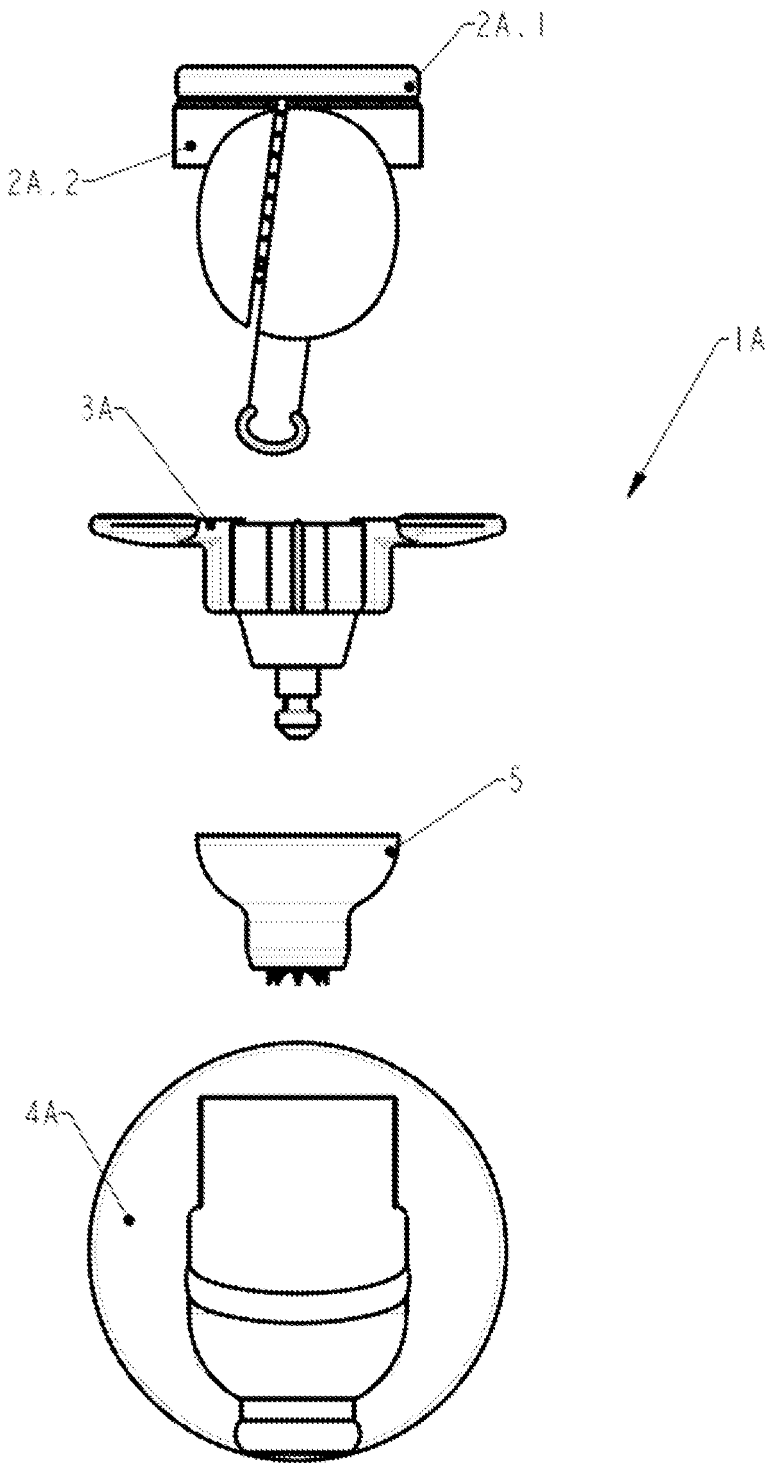
FIG. 17 is an exploded view of the tap according to the prior art.
Figure 18:
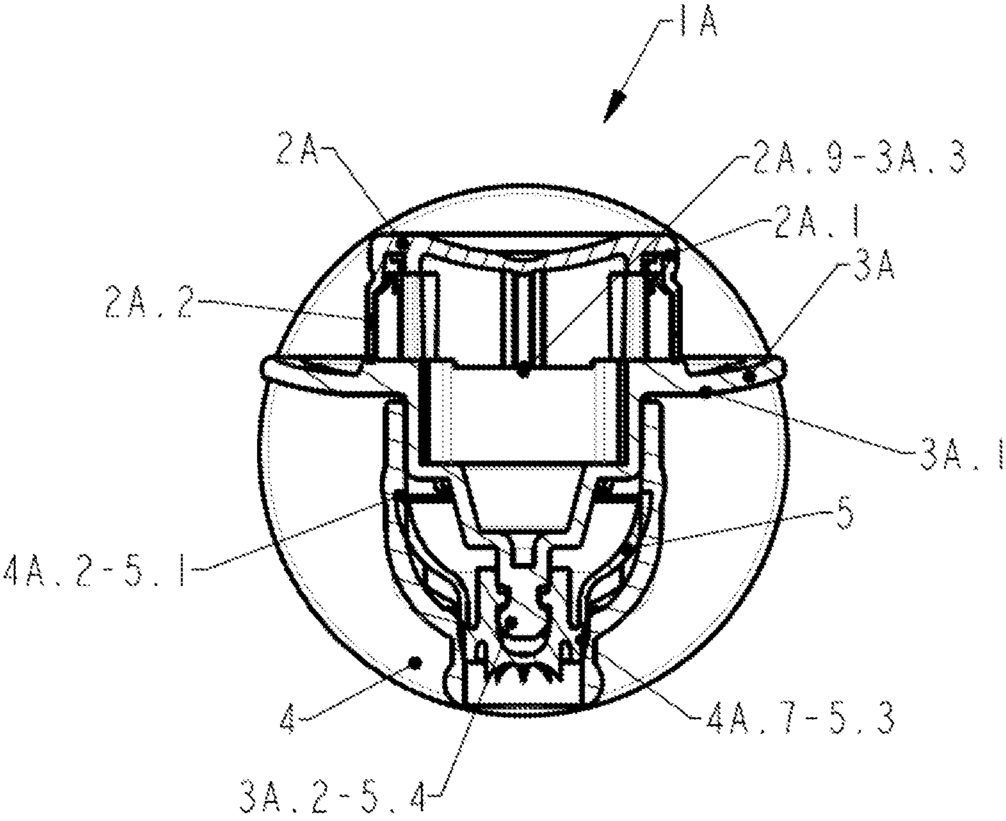
FIG. 18 is a sectional front view of the tap according to the prior art in its closed position and with the removable band seal intact.
Figure 19:
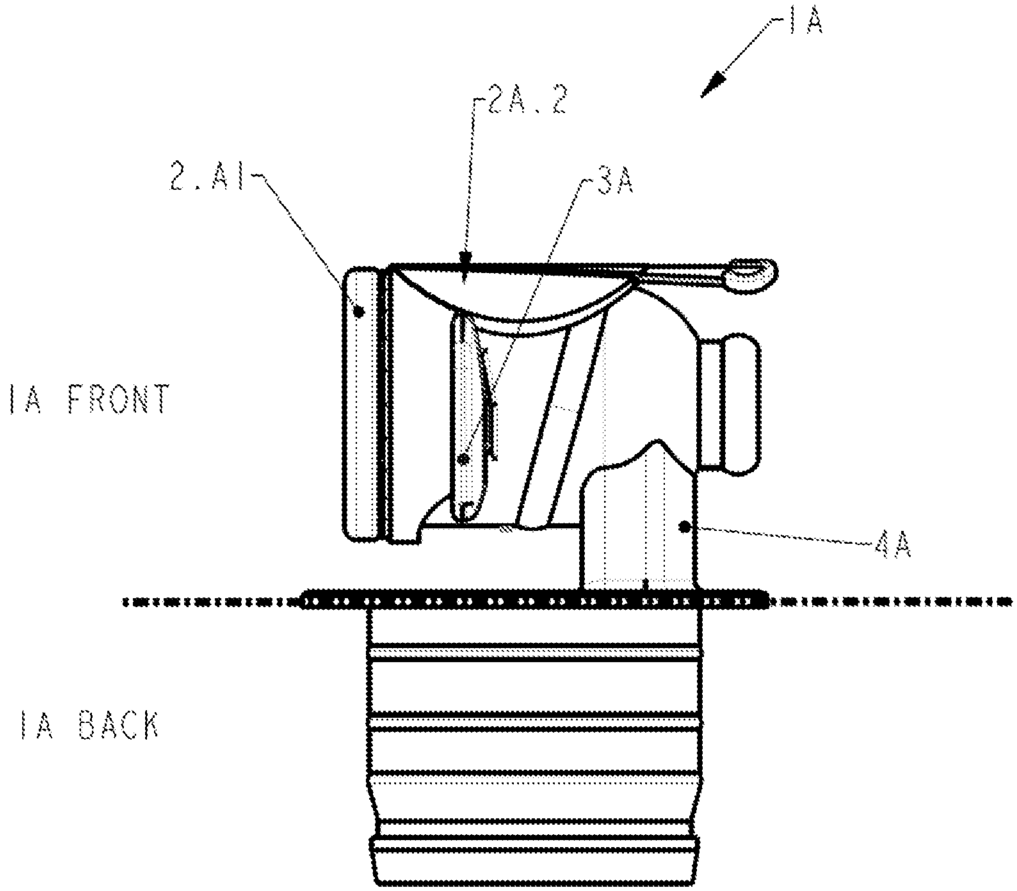
FIG. 19 is a side view of the tap according to the prior art in its closed position and with the removable band seal intact.
Figure 20:
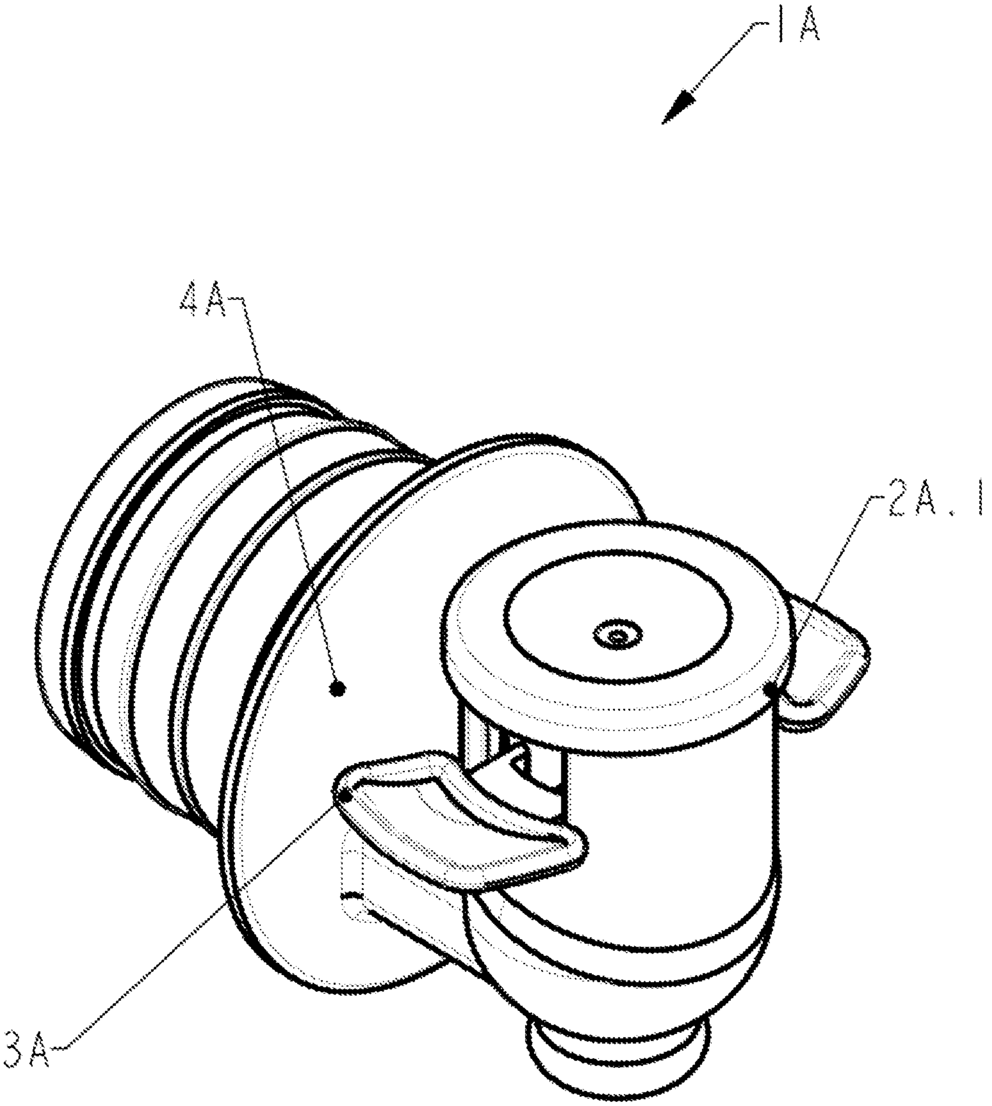
Figure 21:
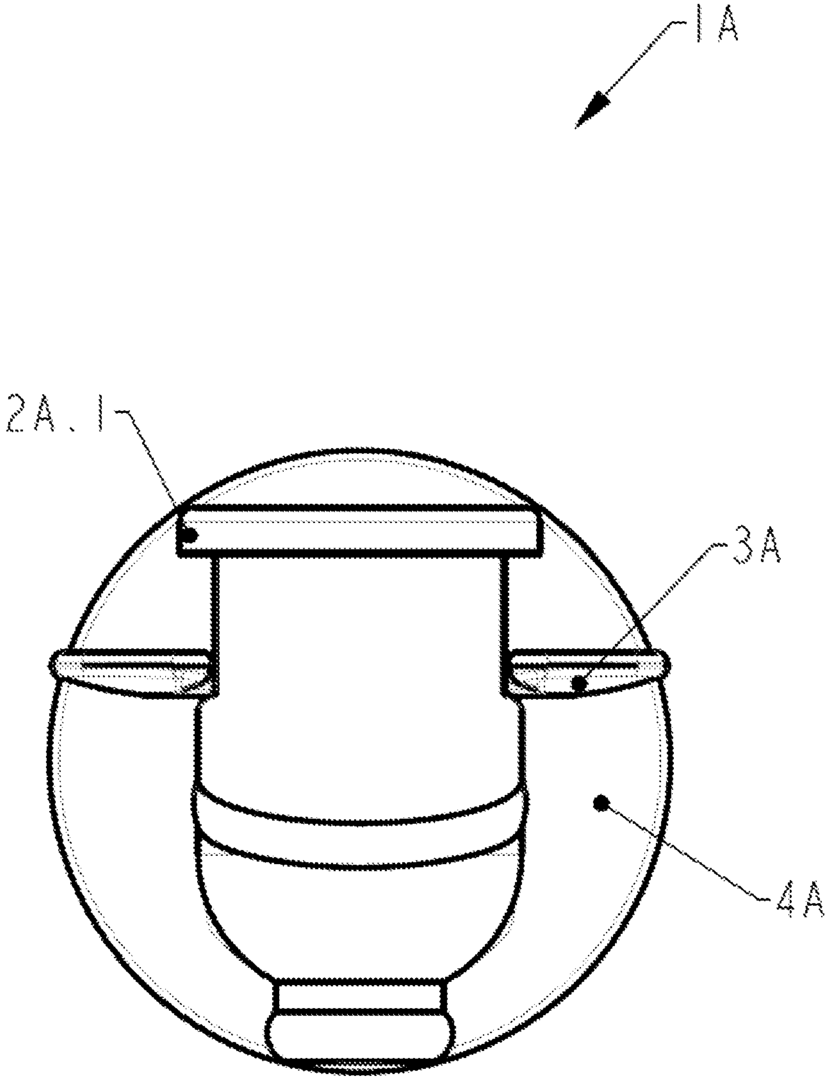
Figure 22:
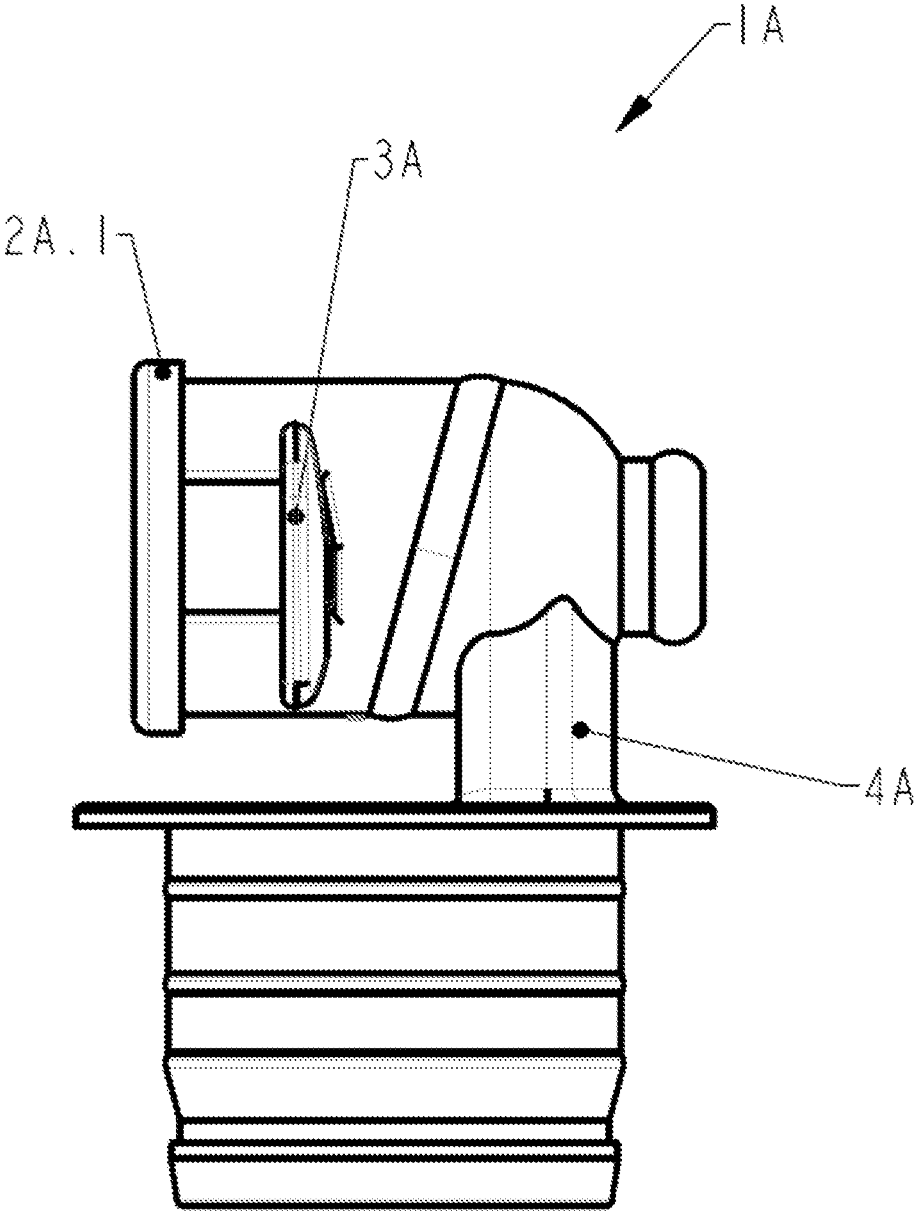
Figure 33:
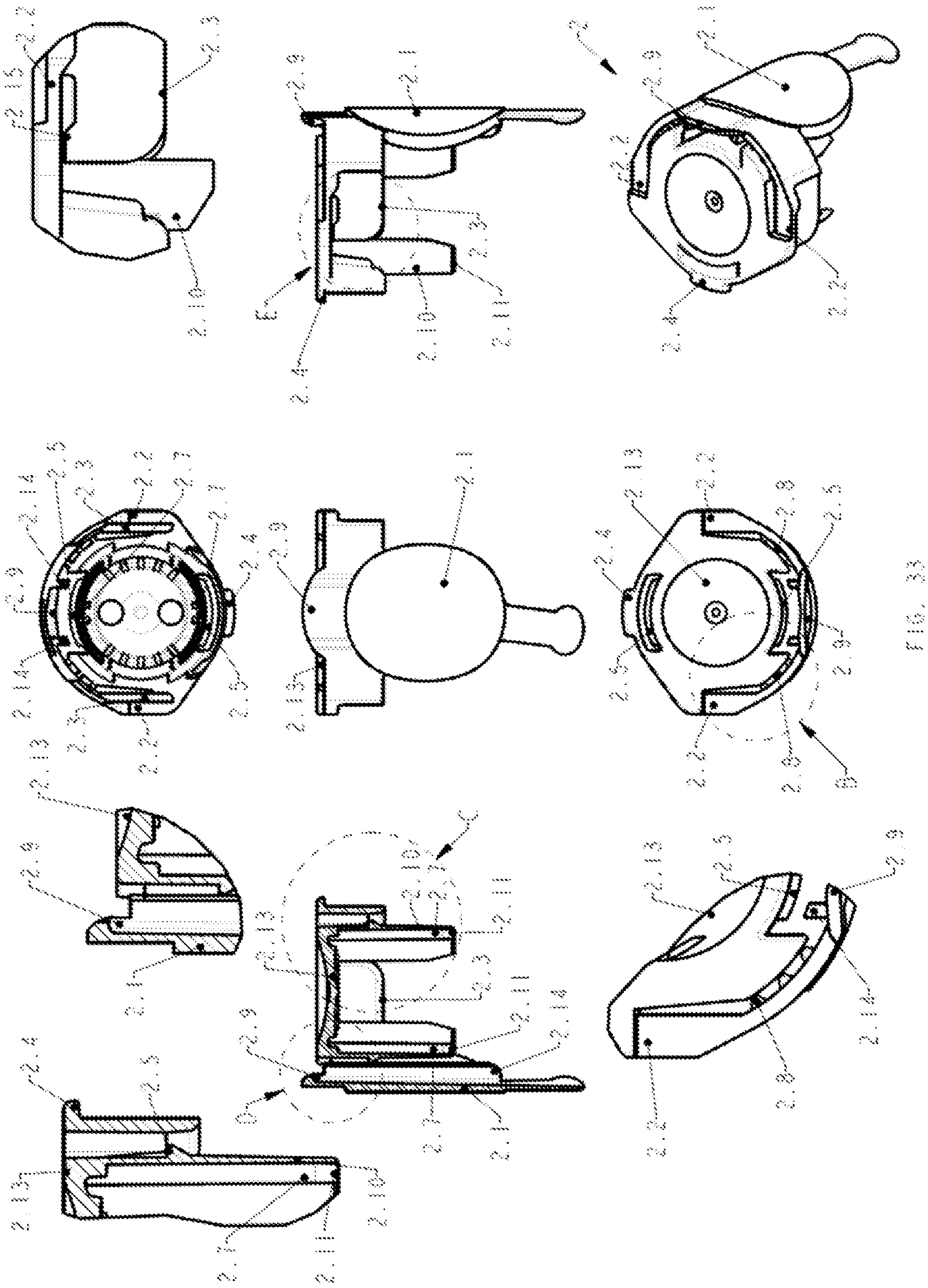
FIG. 33 is a sectional and top detailed isometric front side view of the operating element component of the future version.
Figure 34:
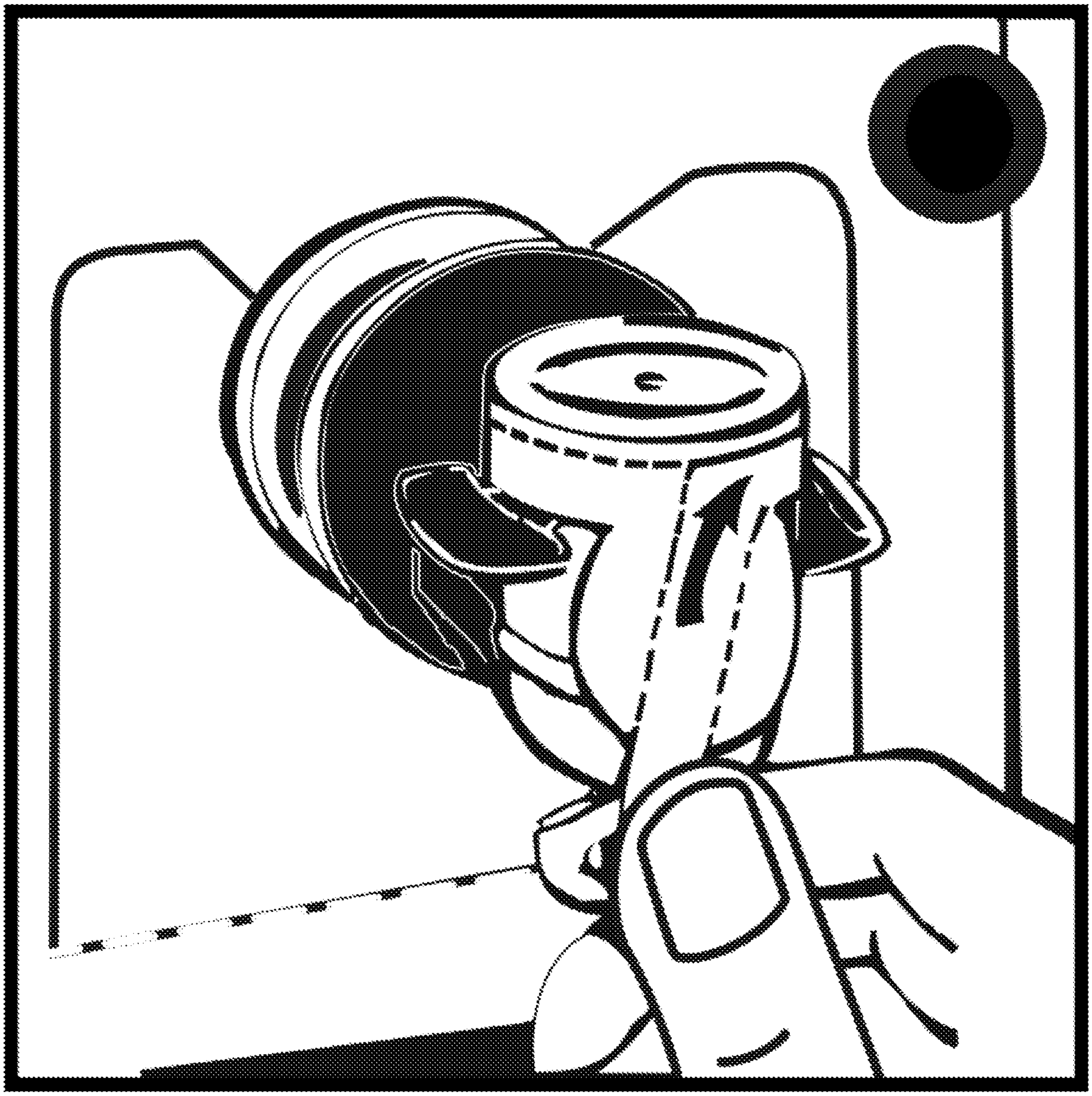
FIG. 34 is a stylized image of the moment of removing the tamper-evident band of the tap currently on the market which in the future will not comply with the new European and international directives.

A first embodiment of the tap 1 of the invention is shown in FIG. 1, and uses a first body 4 of FIG. 30 and the new cap 2 of FIG. 33 with manual opening, as was and still occurs on the traditional tap 1A currently on the market, represented in FIG. 15.

Figure 36:
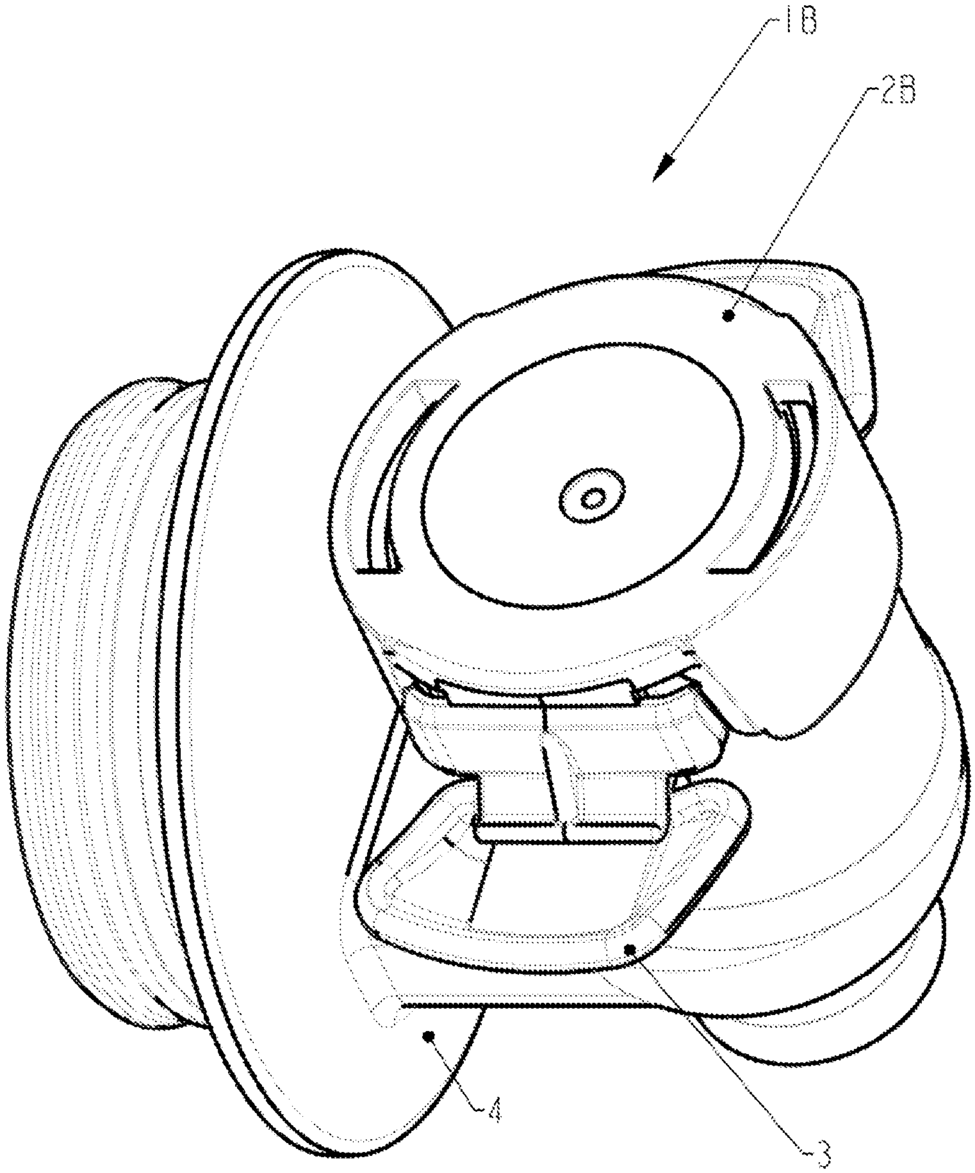
FIG. 36 is an isometric view of the tap 1B with the cap shaped to adapt to the body 4 of FIG. 30.
Figure 37:
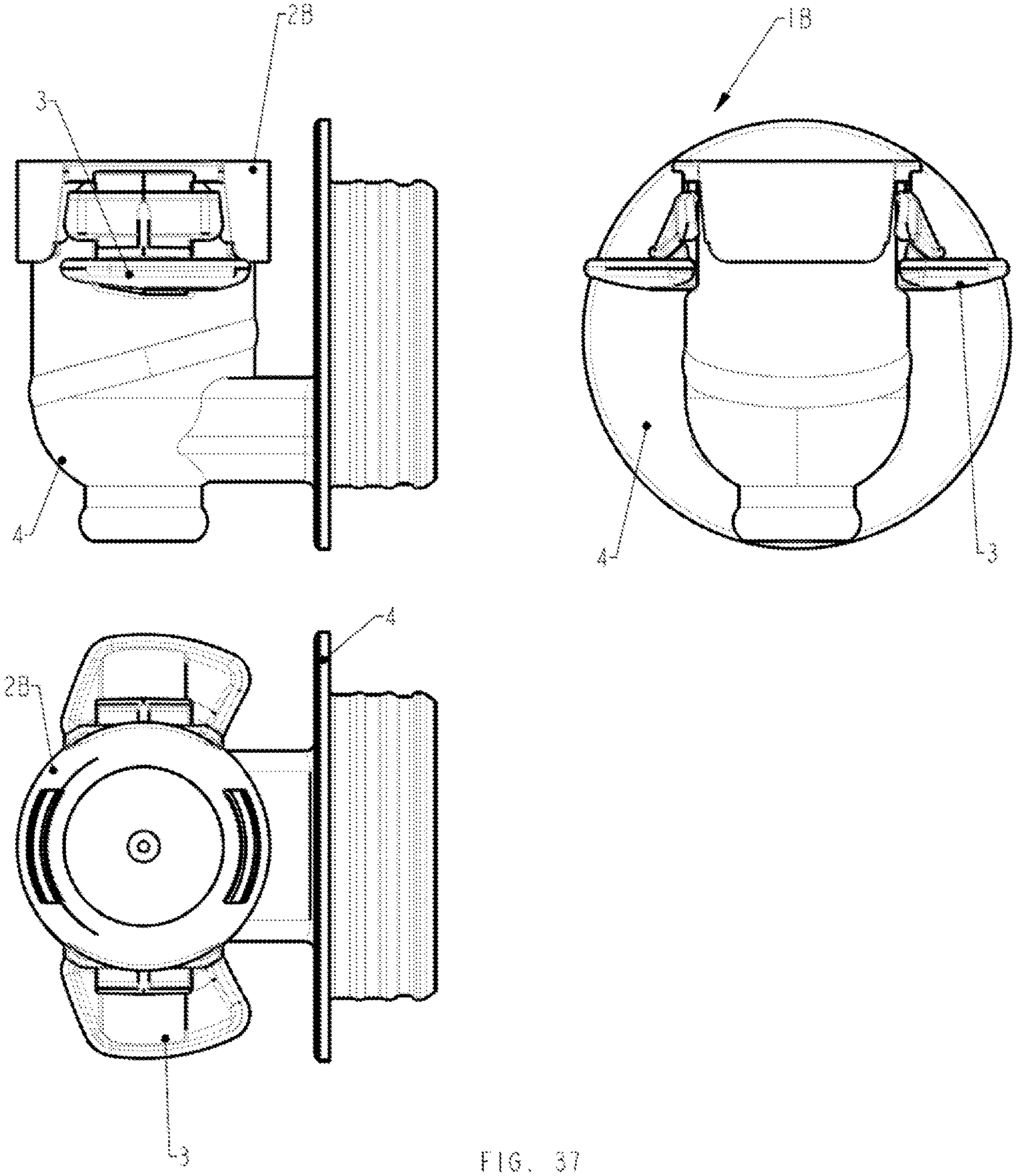
FIG. 37 is a front, side and top view of the tap 1B with the cap shaped to adapt to the body 4 of FIG. 30.
Figure 38:
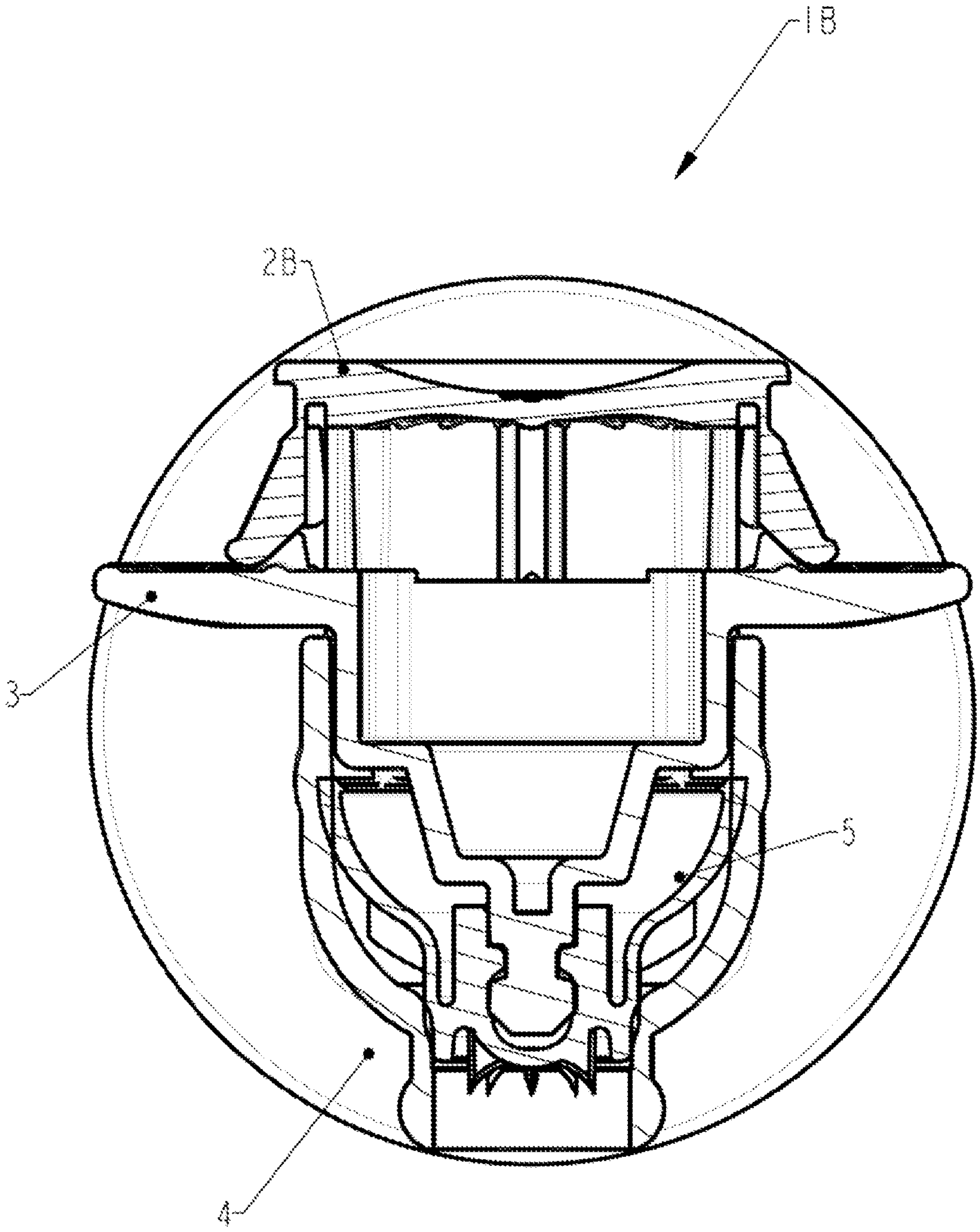
FIG. 38 is a sectional front view of the tap 1B with the cap shaped to adapt to the body 4 of FIG. 30.
Figure 39:
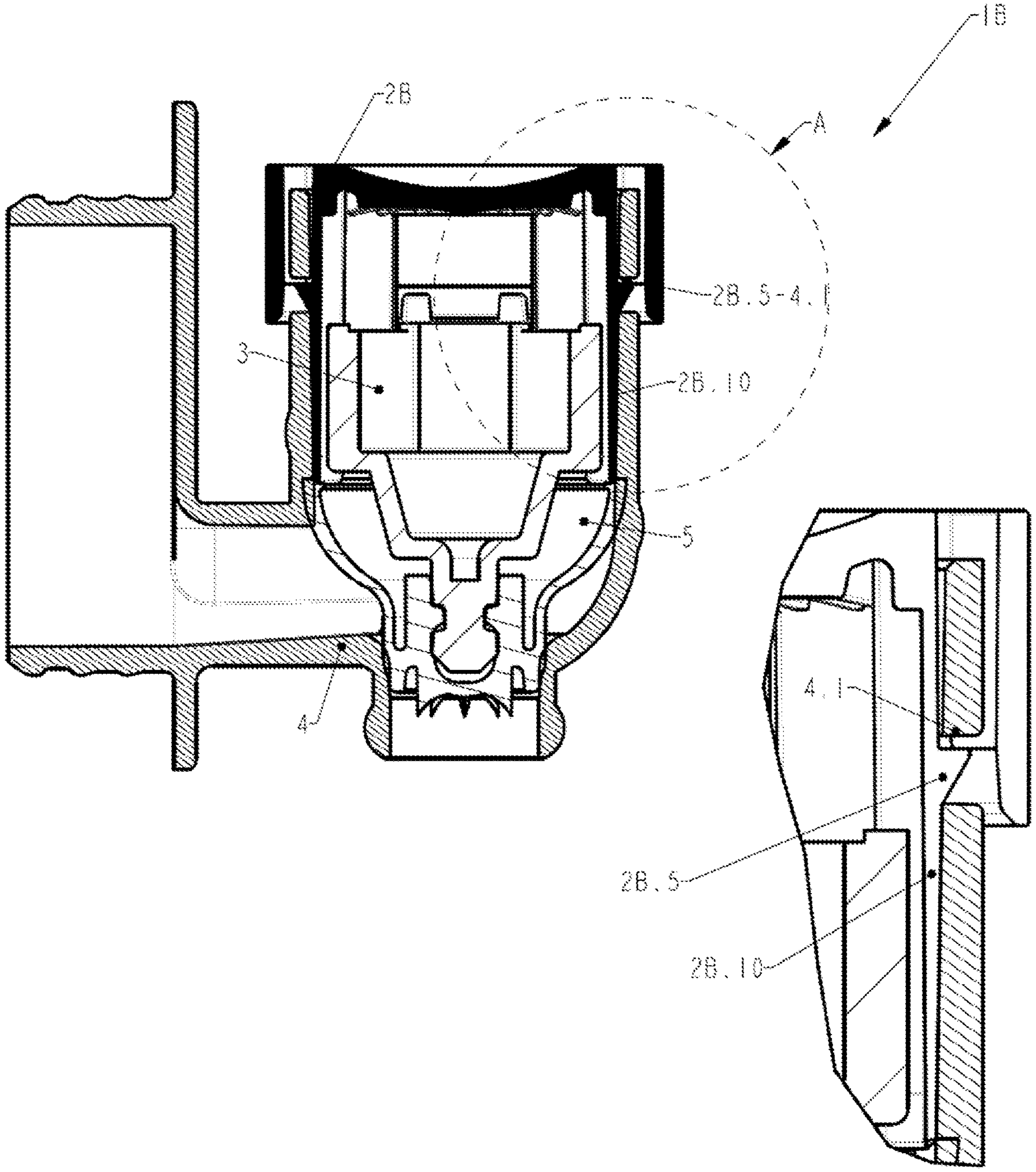
FIG. 39 is a sectional side view and a sectional detail view of the tap 1B with the cap shaped to adapt to the body 4 of FIG. 30.
Figure 40:
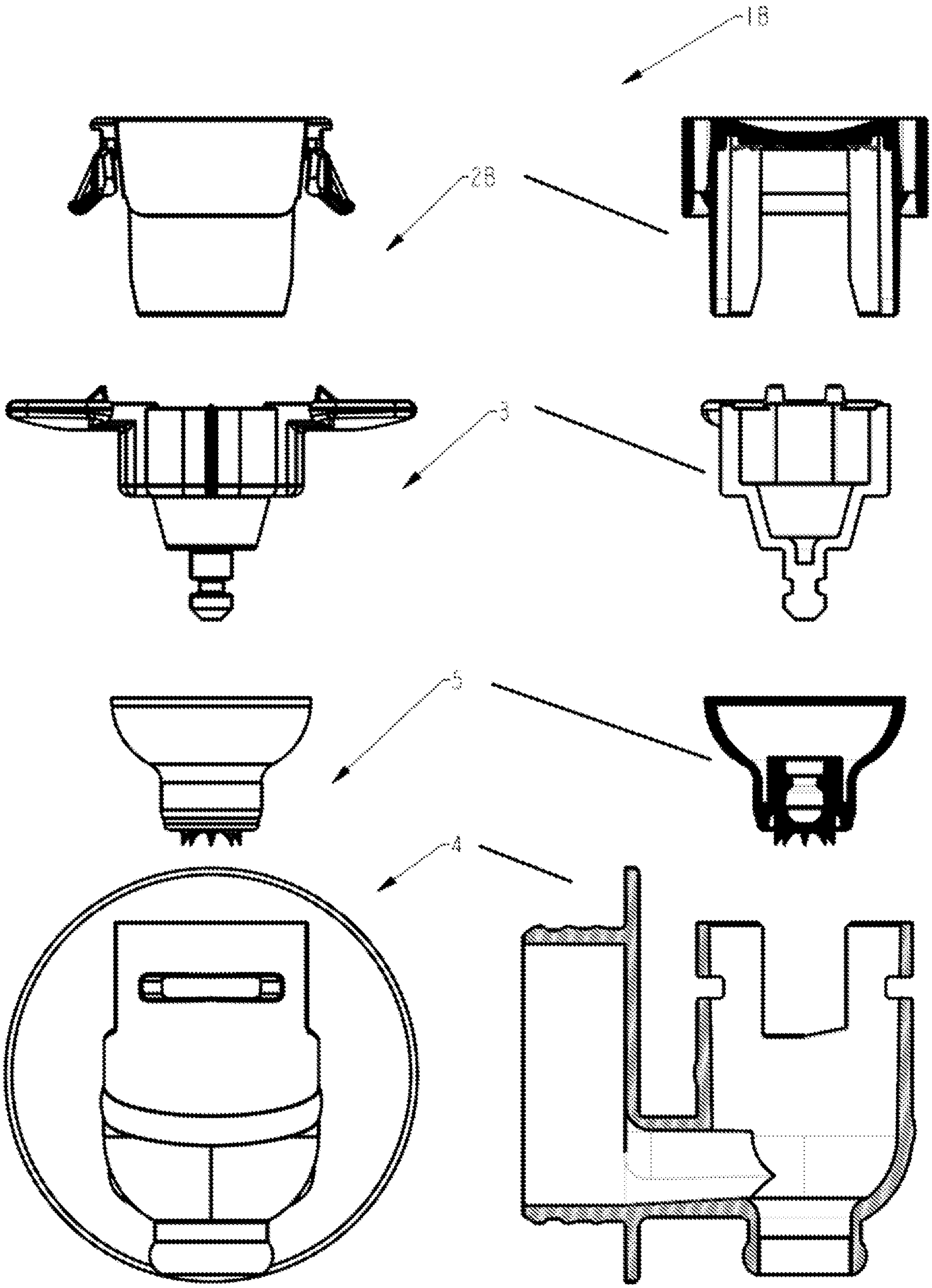
FIG. 40 is an exploded front and side sectional view of the tap 1B with the cap shaped to adapt to the body 4 of FIG. 30.
Figure 41:
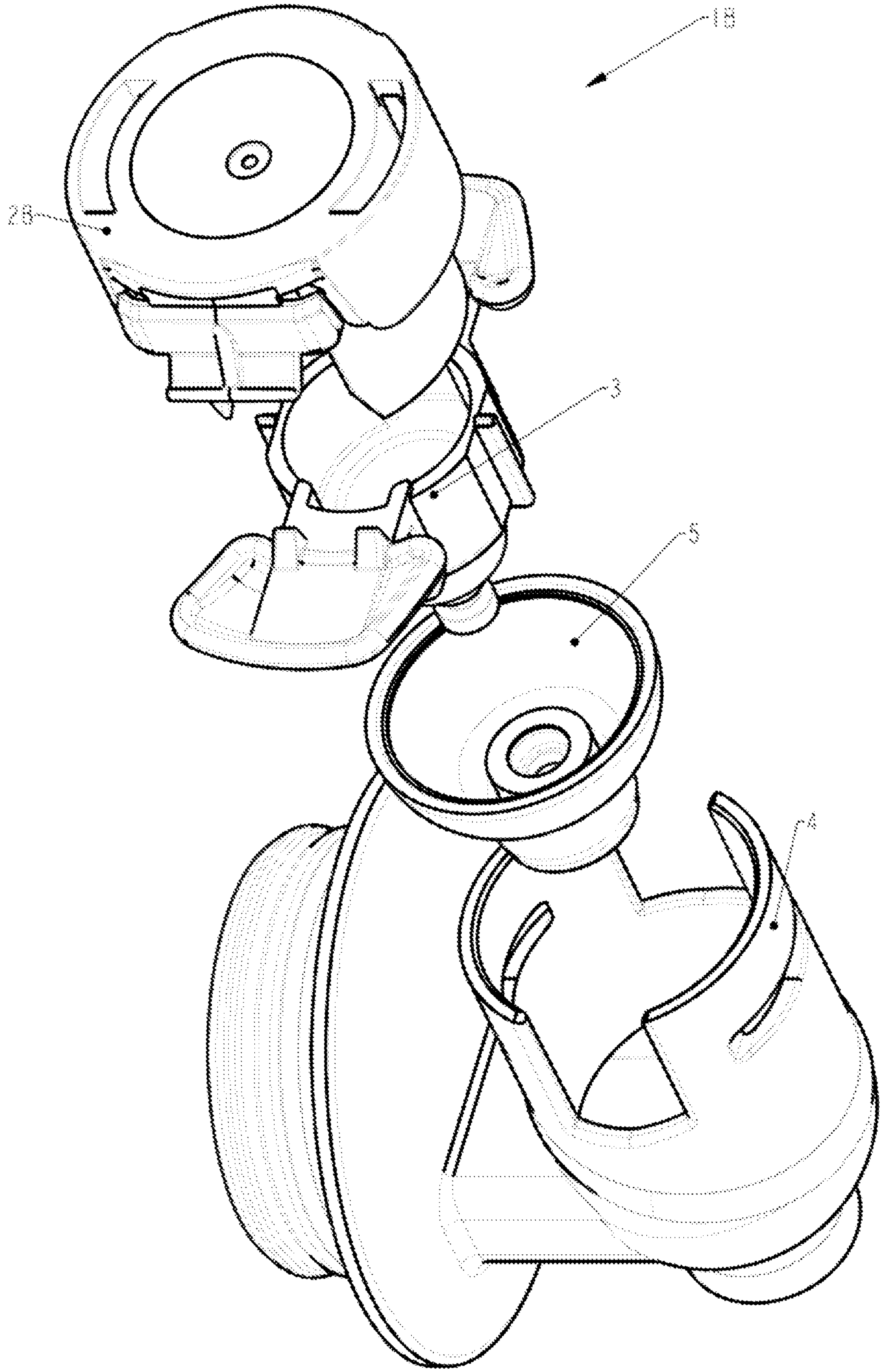
FIG. 41 is an exploded isometric view of the tap 1B with the cap shaped to adapt to the body 4 of FIG. 30.
Figure 42:
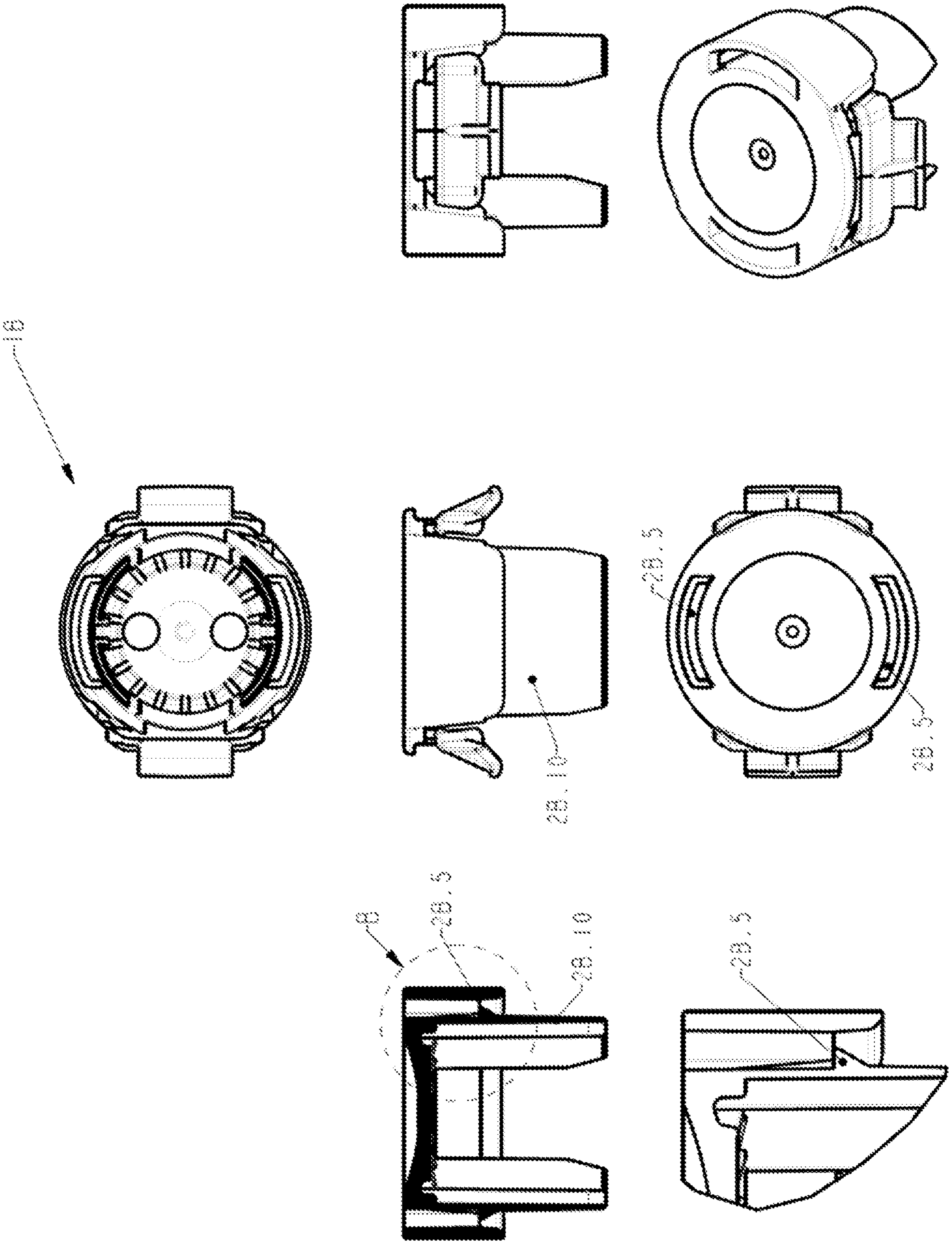
FIG. 42 is an isometric front side top and side sectional view with details of the cap shaped to adapt to the universal body 4 of FIG. 30.

A second embodiment of the tap 1B of the invention is represented in FIG. 36, and always uses the body 4 of FIG. 30 (which is universal for all versions) which is coupled with the new cap 2B of FIG. 39, both with useful geometries for obtaining the joint between the two components, which both serve for dispensing, as already mentioned in document WO2021/111480 by the same Applicant, changing only the connection method between second cap 2 and 2B and body 4 of FIG. 30.

Figure 28:
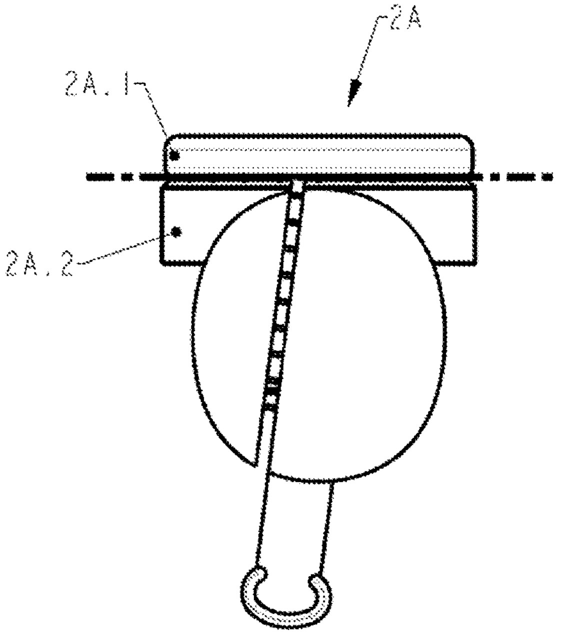
FIG. 28 is a cross-sectional front side isometric view of the hood component with removable tamper-evident band, no longer compliant with future standards, currently on the market.
Figure 28:
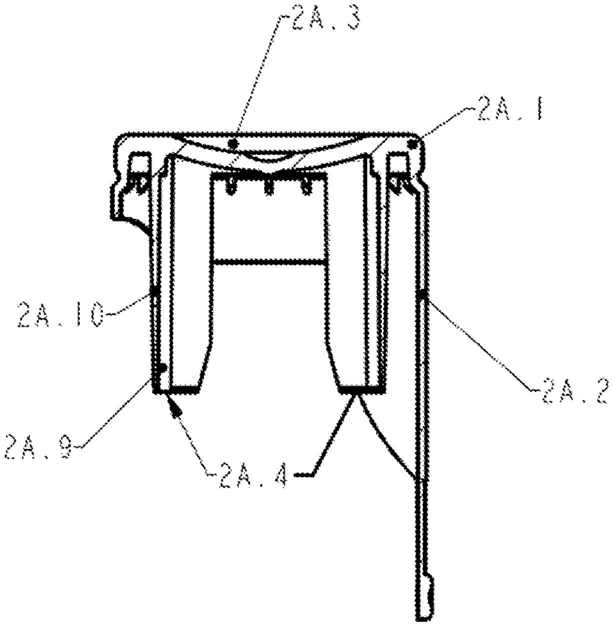
Figure 28:
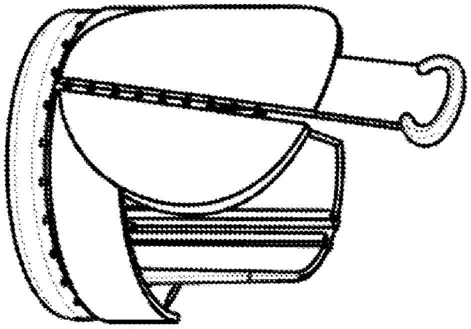
Figure 43:
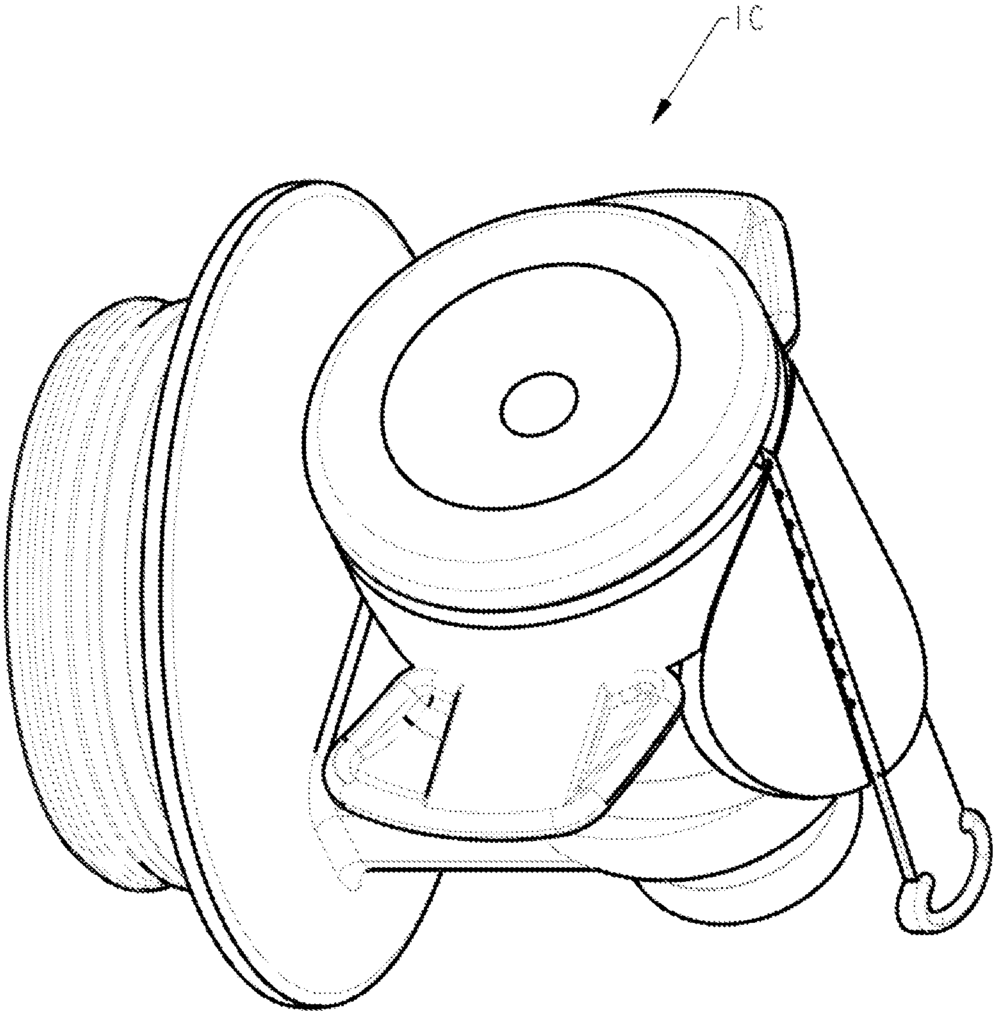
FIG. 43 is an isometric view of the inventive tap 1C with the cap currently on the market adapted to the body 4 of FIG. 30.

Furthermore, the version of the tap 1C of FIG. 43 is also shown here in order to demonstrate that the universal body 4 of FIG. 30 has no problem in adapting also to the cap 2A of FIG. 28 which is currently on the market. Obviously, the standard configuration on the market of the cap 2A of FIG. 28 is shown here, which uses the ultrasonic welding technology to connect stably to the body 4 of FIG. 30: however, it is possible to create the same coupling geometries present on the cap 2 of FIG. 33 and the cap 2B of FIG. 39 to create those coupling geometries useful for exploiting the two front and rear slots 4.1 of FIG. 30 in order to create a coupling between the two cap and body components 4 of FIG. 30.

Figure 44:
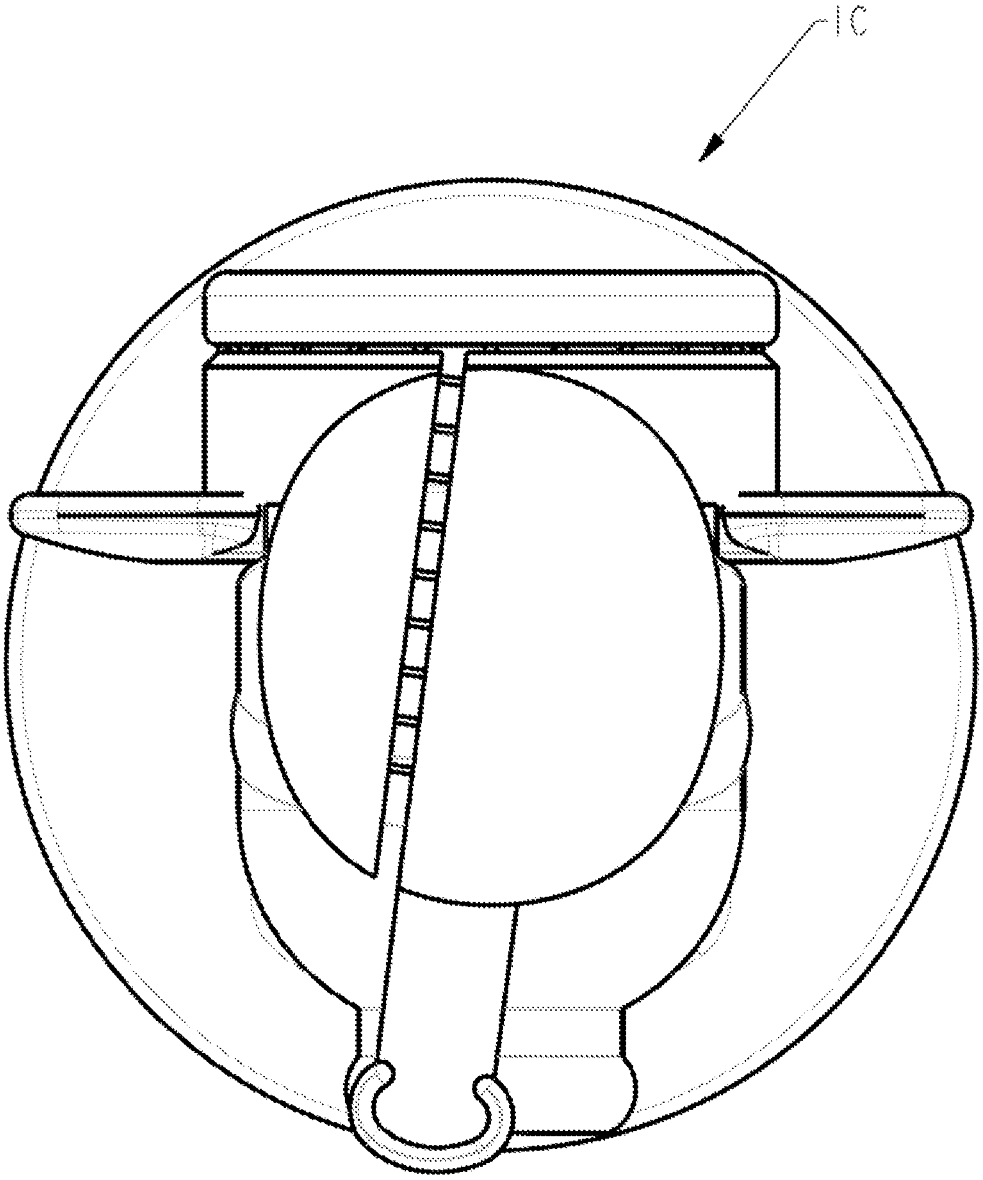
FIG. 44 is a front view of the inventive tap 1C with the cap currently on the market adapted to the body 4 of FIG. 30.
Figure 45:
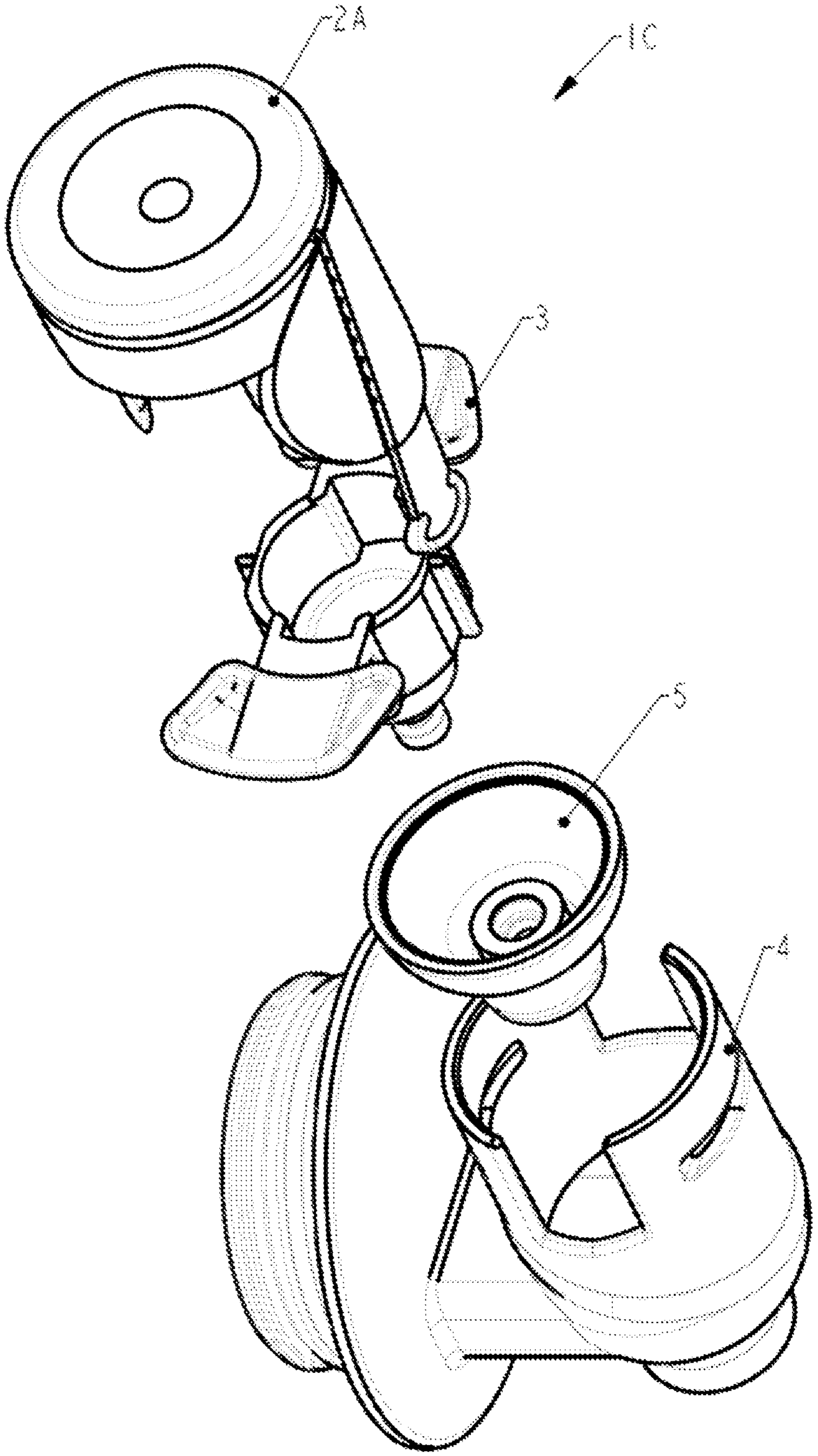
FIG. 45 is an exploded view of the inventive tap 1C with the cap currently on the market adapted to the body 4 of FIG. 30.
Figure 46:
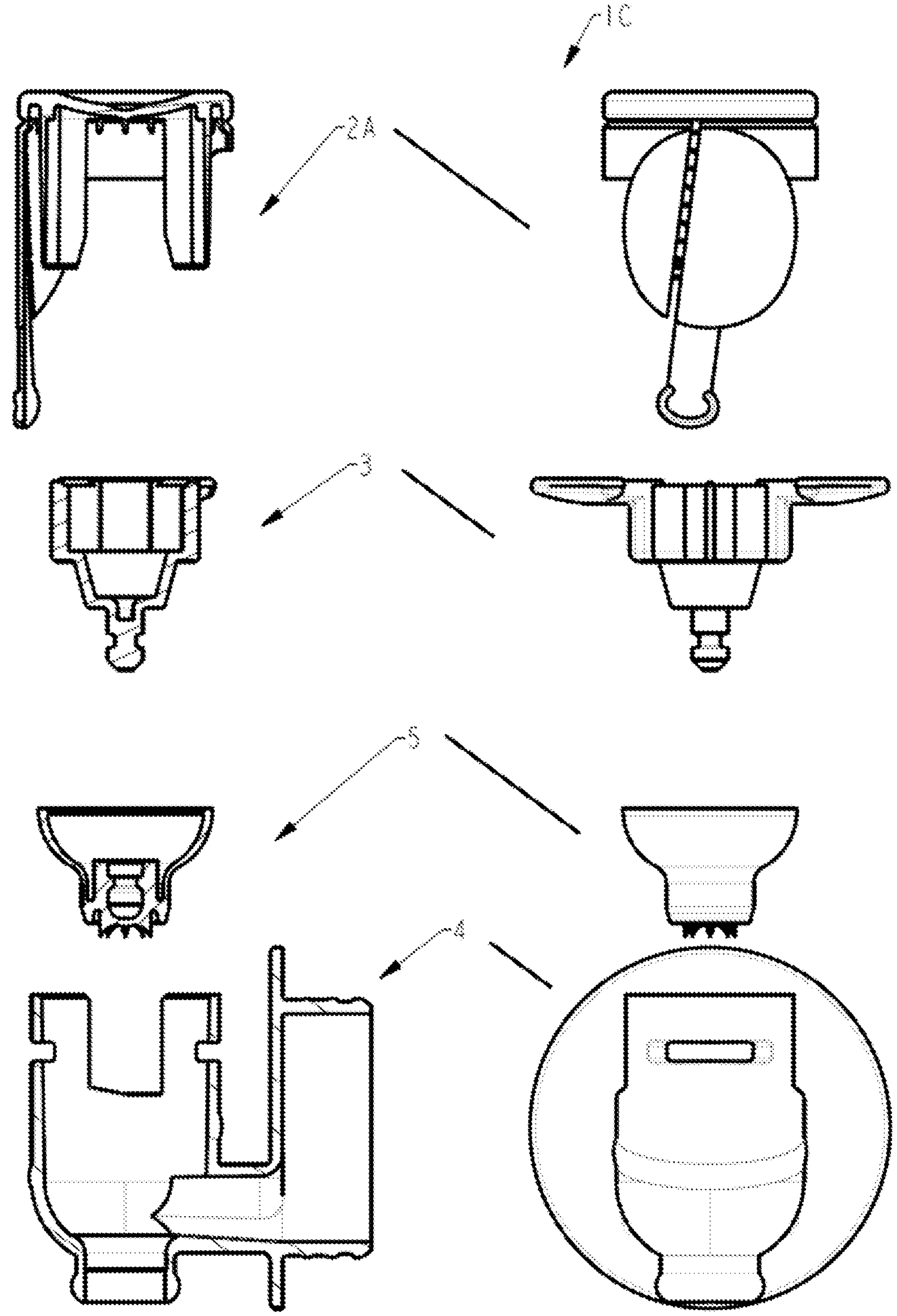
FIG. 46 is a sectional front and side exploded view of the inventive tap 1C with the cap currently on the market adapted to the body 4 of FIG. 30.

Obviously, this third solution 1C of FIG. 44 is shown only to confirm the universality of the body 4 of FIG. 30, but it will not be taken into consideration because, even if it is understood that the dispenser tap 1C would work optimally, it would not be able to meet the new European and international directives on disposable plastic items (SUP), as the tamper-evident band, unlike the other versions 1 and 1B, is removable and therefore disperses into the environment.

Figure 31:
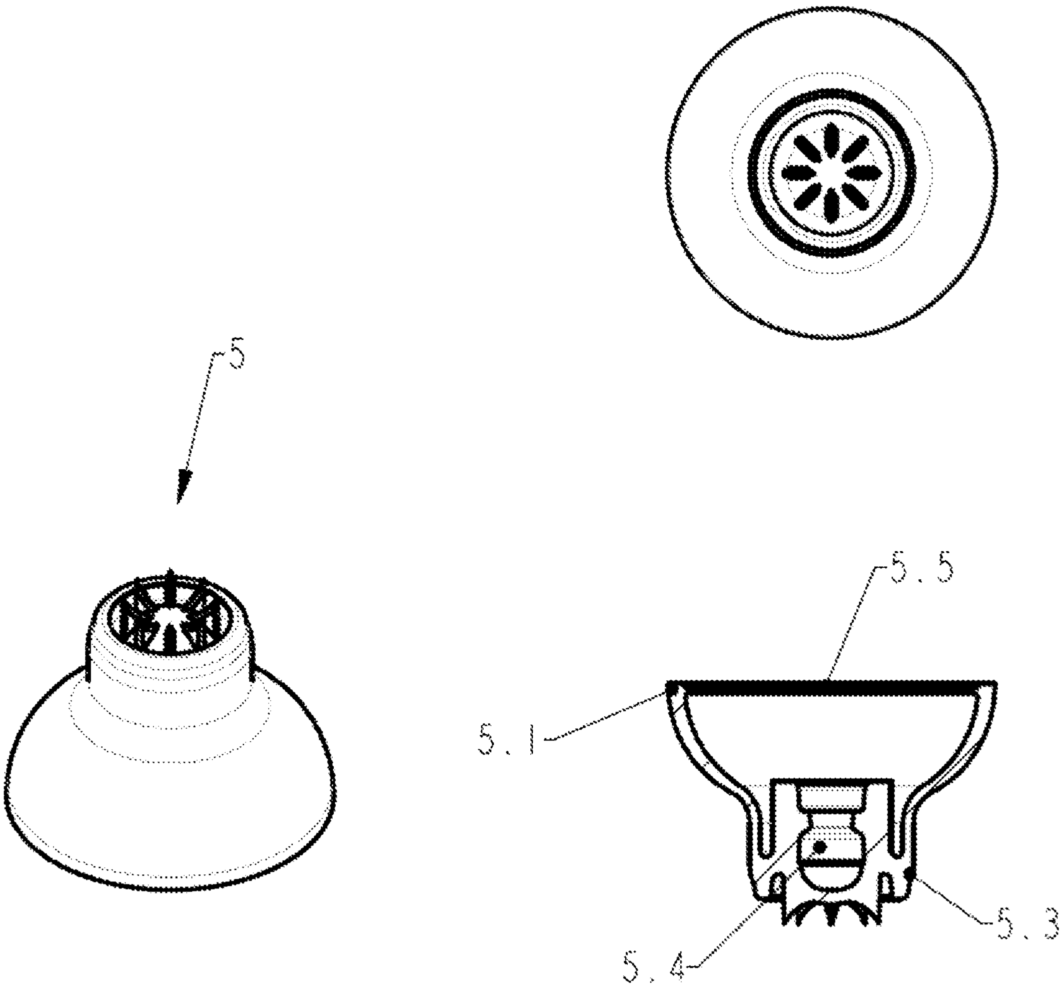
FIG. 31 is a cross-sectional and upper front side isometric view of the internal valve component currently on the market but which remains the same also for the future solution.
Figure 32:
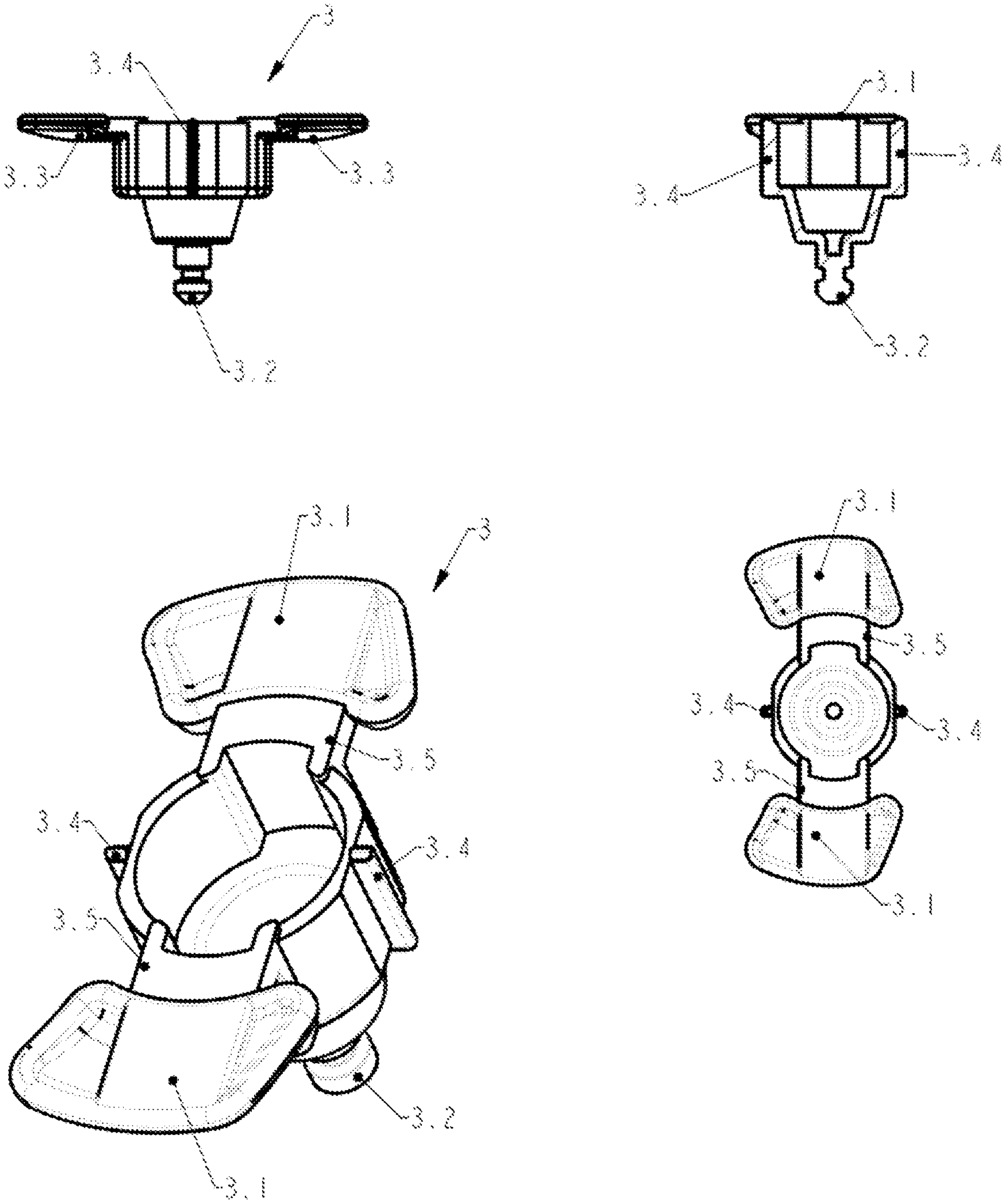
FIG. 32 is a sectional and top detailed isometric front side view of the operating element component of the future version.

Considering instead the versions 1 (FIGS. 1) and 1B (FIG. 36), they comply with the new European and international directives on disposable plastic items (SUP), and in both versions they also use the new driving wings 3 of FIG. 32 with the 3.1 opening planes integrated on each flap (this allows modifying the current operating element as it will be easy and economical to add the two planes 3.1 of FIG. 32 on each flap) and the internal valve or elastic dome membrane 5 of FIG. 31 equal to that used today on the tap 1C on the market shown in FIG. 15. The fact of being able to reuse the components currently produced (or in any case reuse them with a small modification, as in the case of the operating element with the addition of wedges) gives further value to the present invention, as it saves time and money and does not change the final perception of the customer, as the new geometries are “hidden”.

The new inventive solution of the tap 1 of FIG. 1 will now be analyzed, which has a new seal/cap 2 that can be opened manually, and which has such a geometry that it can be compared aesthetically and also functionally to the seal/cap of the tap 1A currently on the market in FIG. 15.

Figure 12:
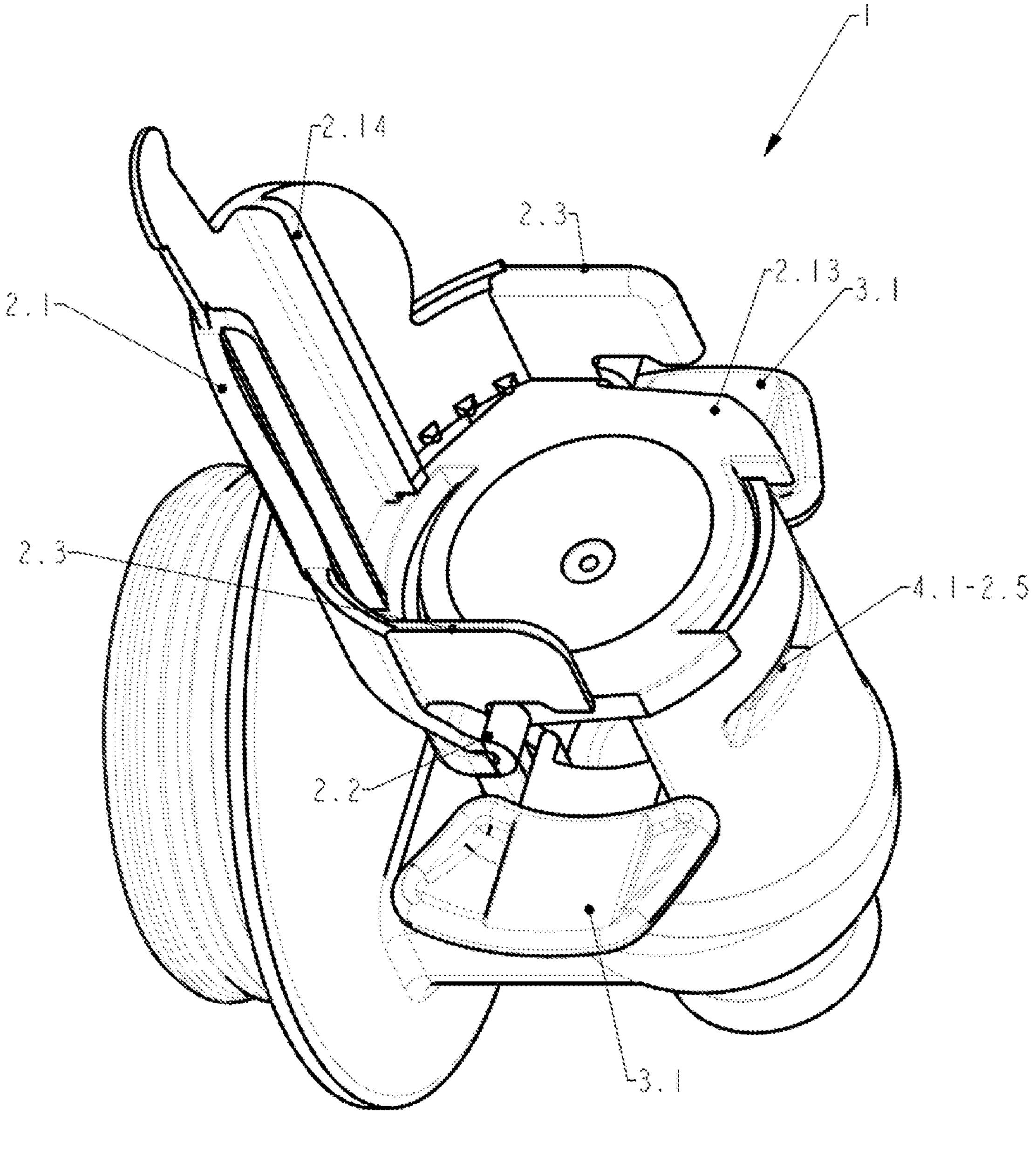
FIG. 12 is an isometric view of the tap in complete opening (opening at 100%) according to the present invention.

This inventive seal 2 of FIG. 1 allows manually freeing the fins 3, allowing their movement and therefore the opening and delivery of fluid from the tap itself, all this while keeping the seal 2 bound to the inventive tap 1 as shown in FIG. 12.

Figure 23:
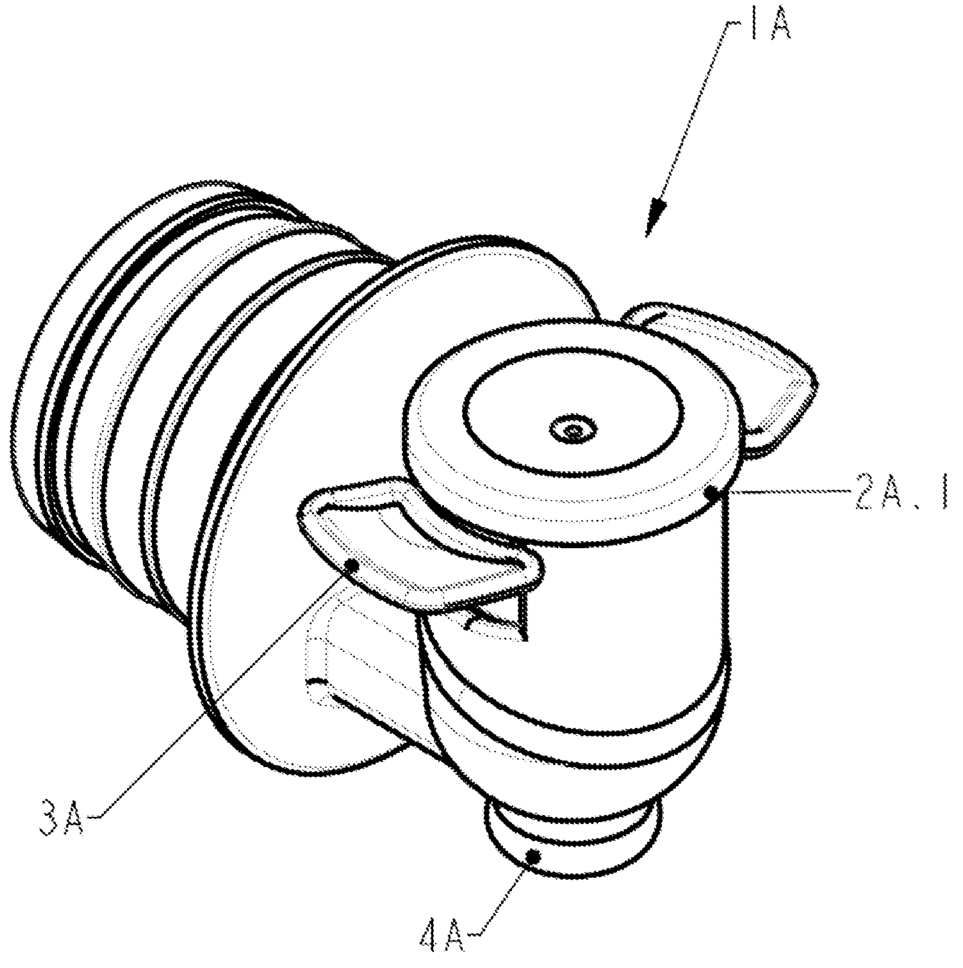
FIG. 23 is a perspective view of the tap according to the prior art in its open position.
Figure 24:
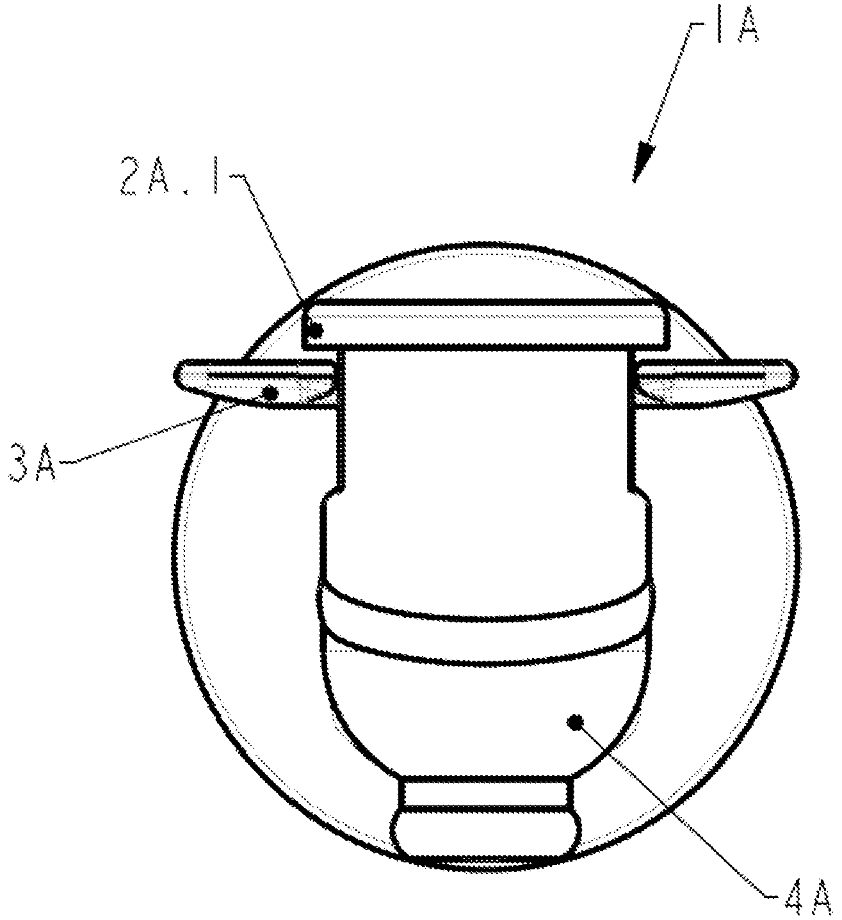
FIG. 24 is a front view of the tap according to the prior art in its open position.
Figure 25:
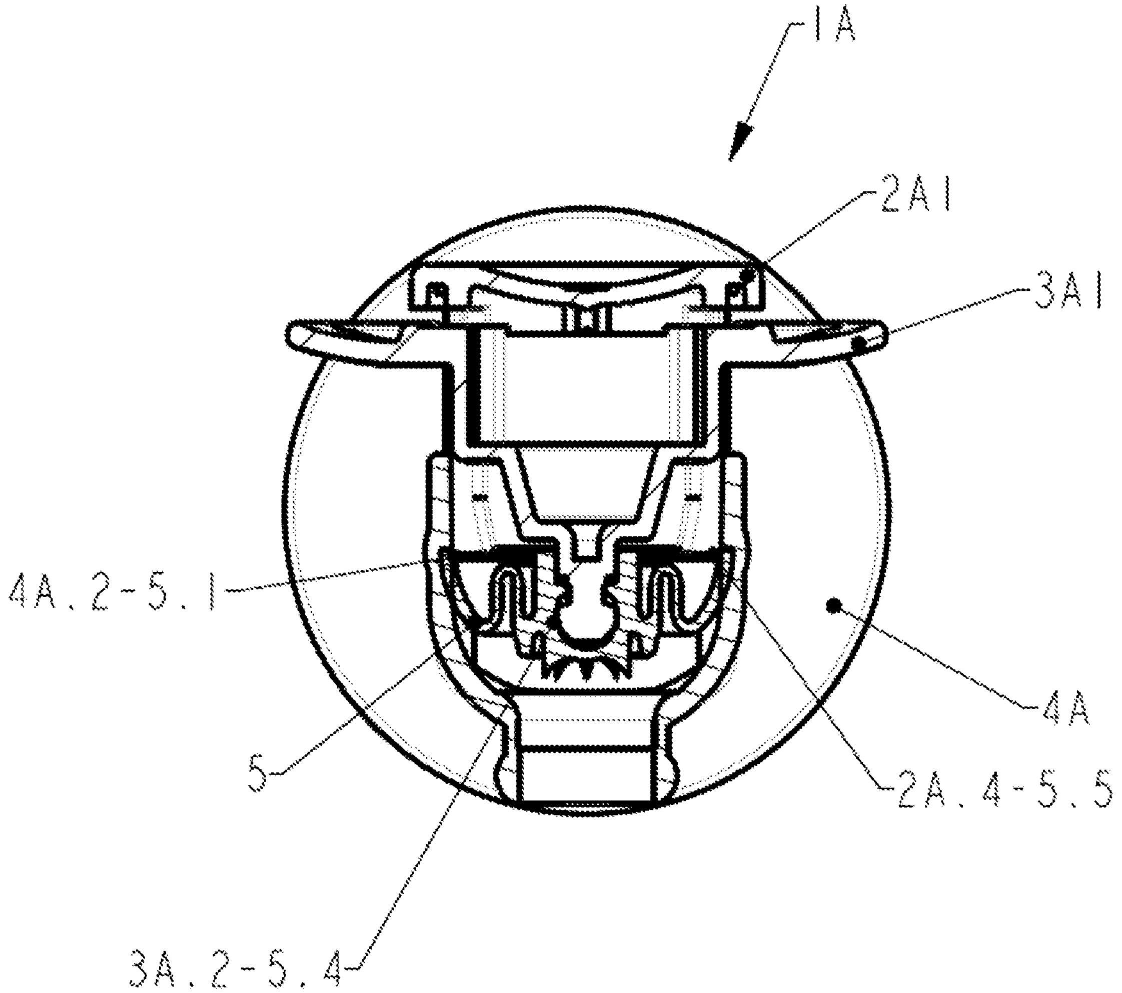
FIG. 25 is a sectional front view of the tap according to the prior art in its open position.
Figure 26:
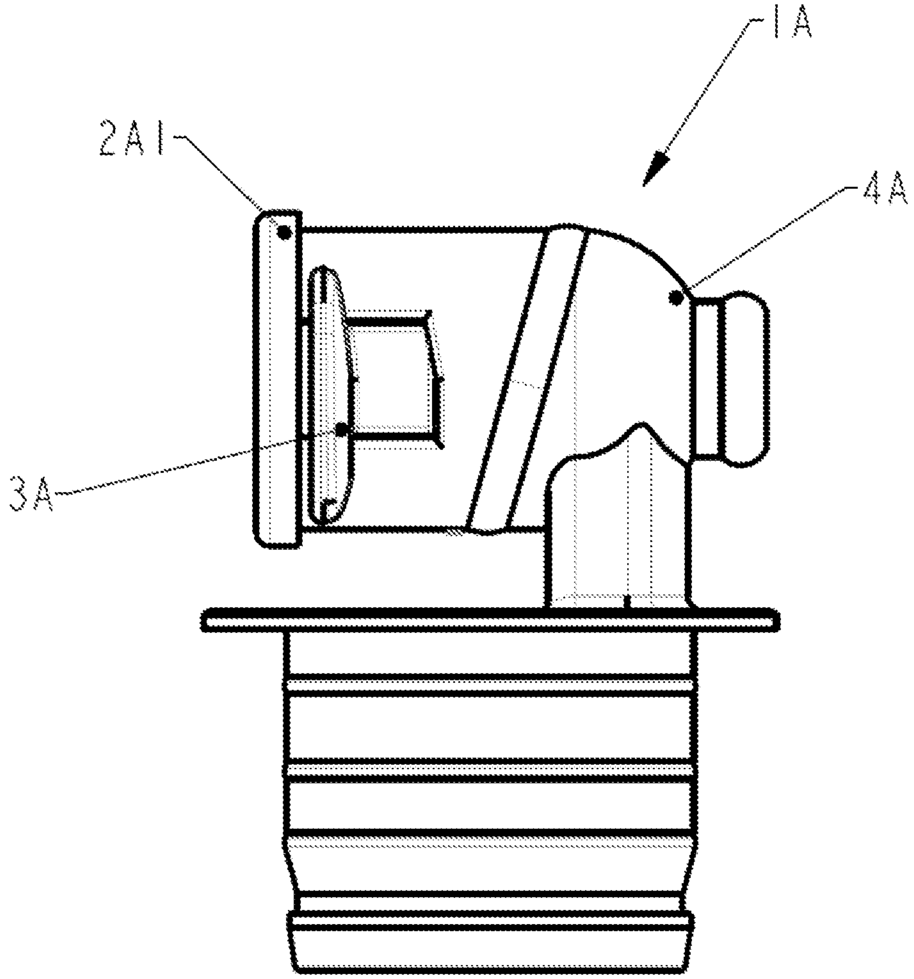
FIG. 26 is a side view of the tap according to the prior art in its open position.
Figure 27:
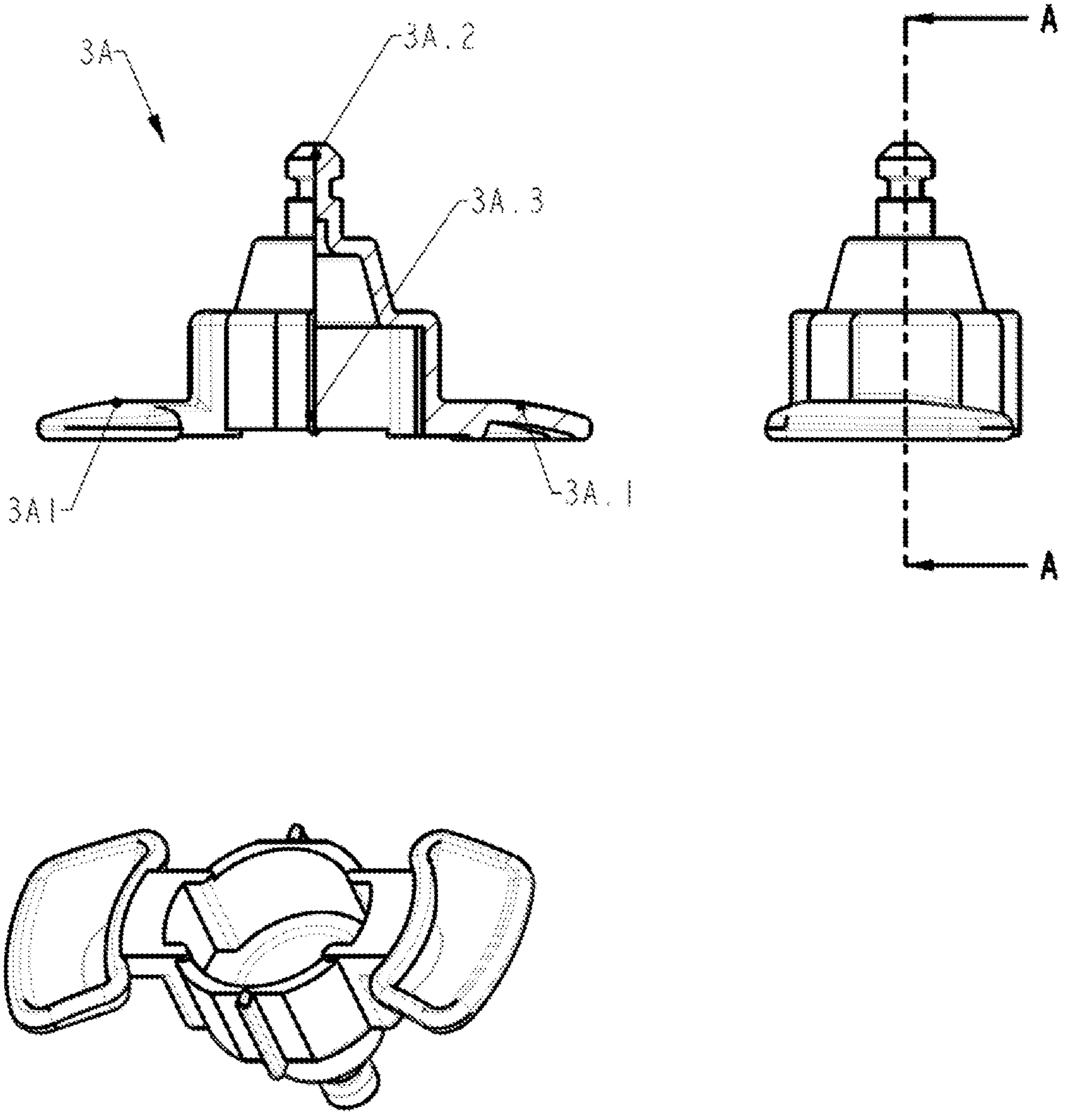
FIG. 27 is a cross-sectional front side isometric view of the operating element component currently on the market of the known solution.

As can be immediately noticed, unlike the known model 1B of FIG. 23, which has an automatic opening of the lateral tamper-evident flaps, this new cap 2 has a tamper-evident flap 2.1 with manual front opening (FIG. 1) and is firmly bound to the main body, avoiding its loss into the environment, due to the flexible hinges 2.2 of FIG. 1.

The new version of cap 2, body 4 and element 3 of FIG. 1 will now be analyzed, leaving out only at the end the analysis that explains how to adapt the new coupling geometries of the tap 1B of FIG. 36 to the new geometry of body 4 of FIG. 30.

With reference to FIGS. 1, 2, 3, 4, 5, 6, 7, 8, 9, 10, 11, 12, 13, 14, 32 and 33, the tap 1 of the present invention is provided with a configuration which substantially comprises:

a body 4 (FIG. 30), which is a body with a “traditional” geometry equal to that used today for the tap 1A currently on the market, on which the necessary geometries were then obtained to make it compatible with the new caps 2 (and consequently also with the cap 2B) which will soon come on the market, making it universal: this provides a huge advantage in terms of cost and time of realization of the entire project, as it allows the use of components and equipment to produce the existing taps 1A to make the inventive tap 1 highlighting its “green” side even more. This body 4 is equipped with an elongated end 4 BACK formed by a cylinder 4.3, preferably placed perpendicular to the front cylinder 4.2 of FIG. 30, identifiable in the area 4 FRONT. The necessary geometries are obtained on the elongated part 4.3 of FIG. 30 in order to obtain, due to the interference between the surfaces of the components concerned (in this case the body 4 and the connection nozzle with the container, not shown), the element connection (and liquid seal) 4.6 on the connection nozzle with the container (not shown), and the anti-removal (anti-counterfeiting) element 4.5 connecting with the container (not shown), preferably but not limited to the BIB. Between the 4 Front part and the 4

Figure 4:
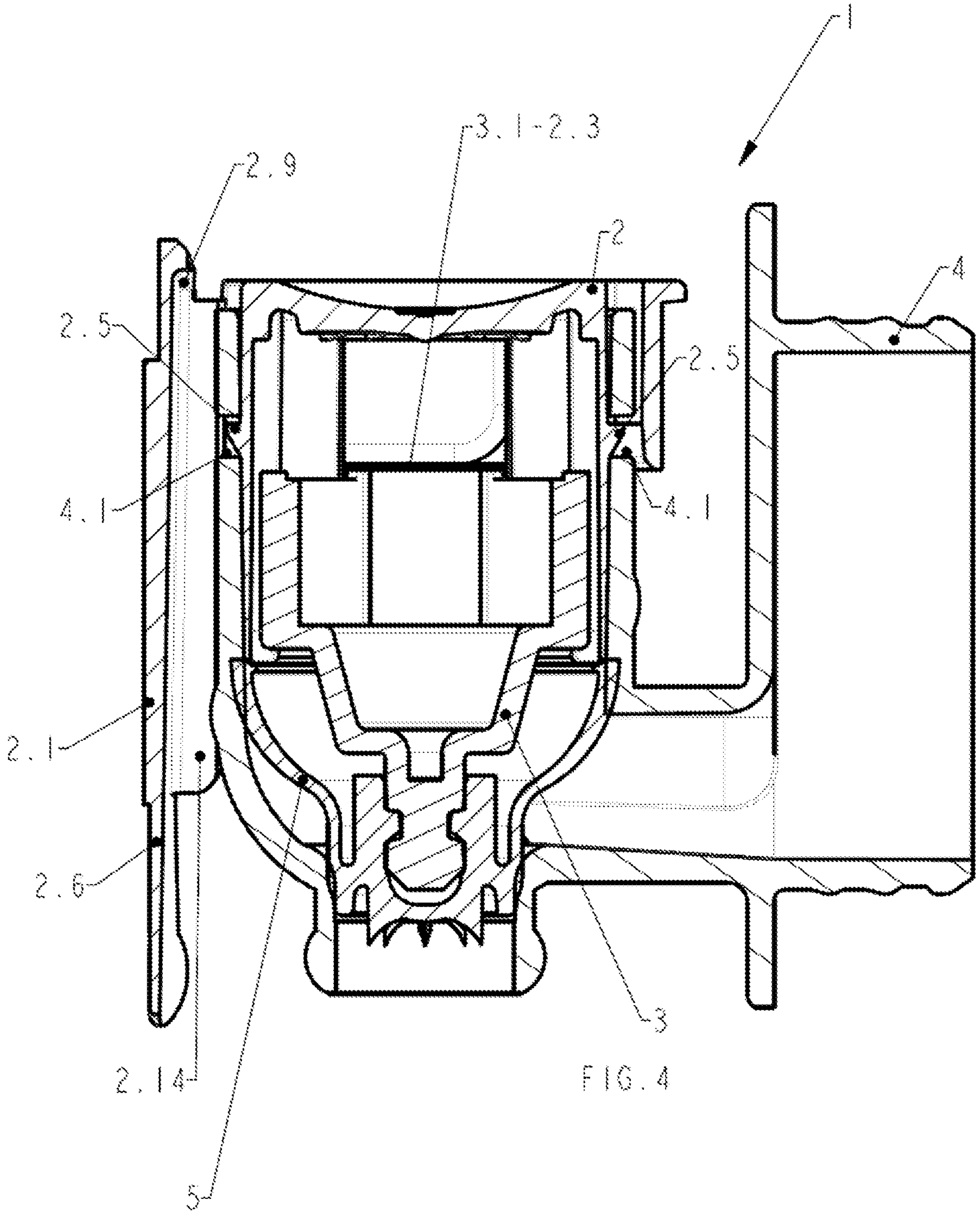
FIG. 4 is a sectional front view and a side view of an embodiment of the tap according to the present invention in its closed position.
Figure 29:
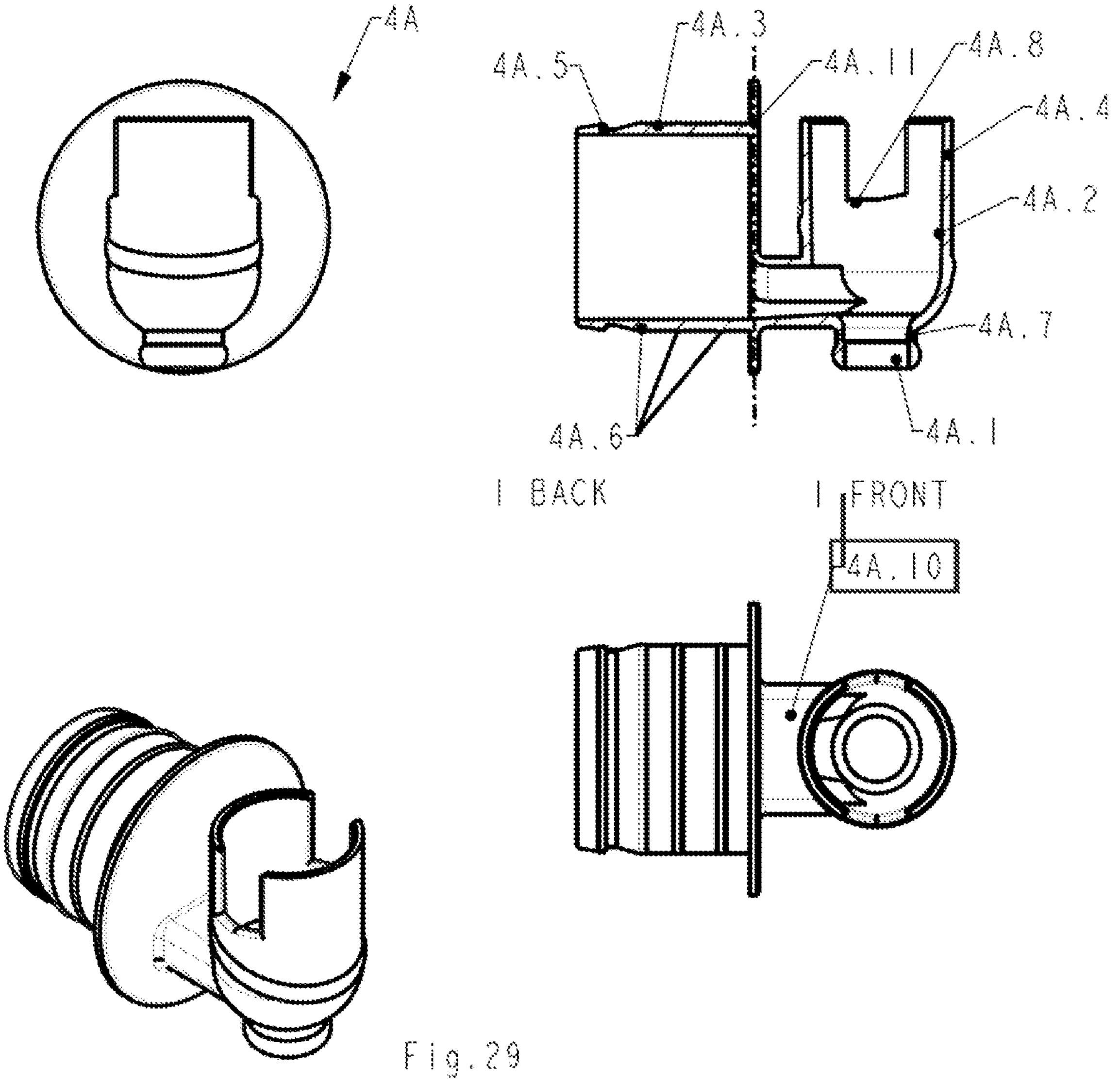
FIG. 29 is an isometric front side cross-section and top view of the body component currently on the market which, however, for the solution which provides for the welding of the two components (body and cap), does not change even for future versions.
Figure 35:
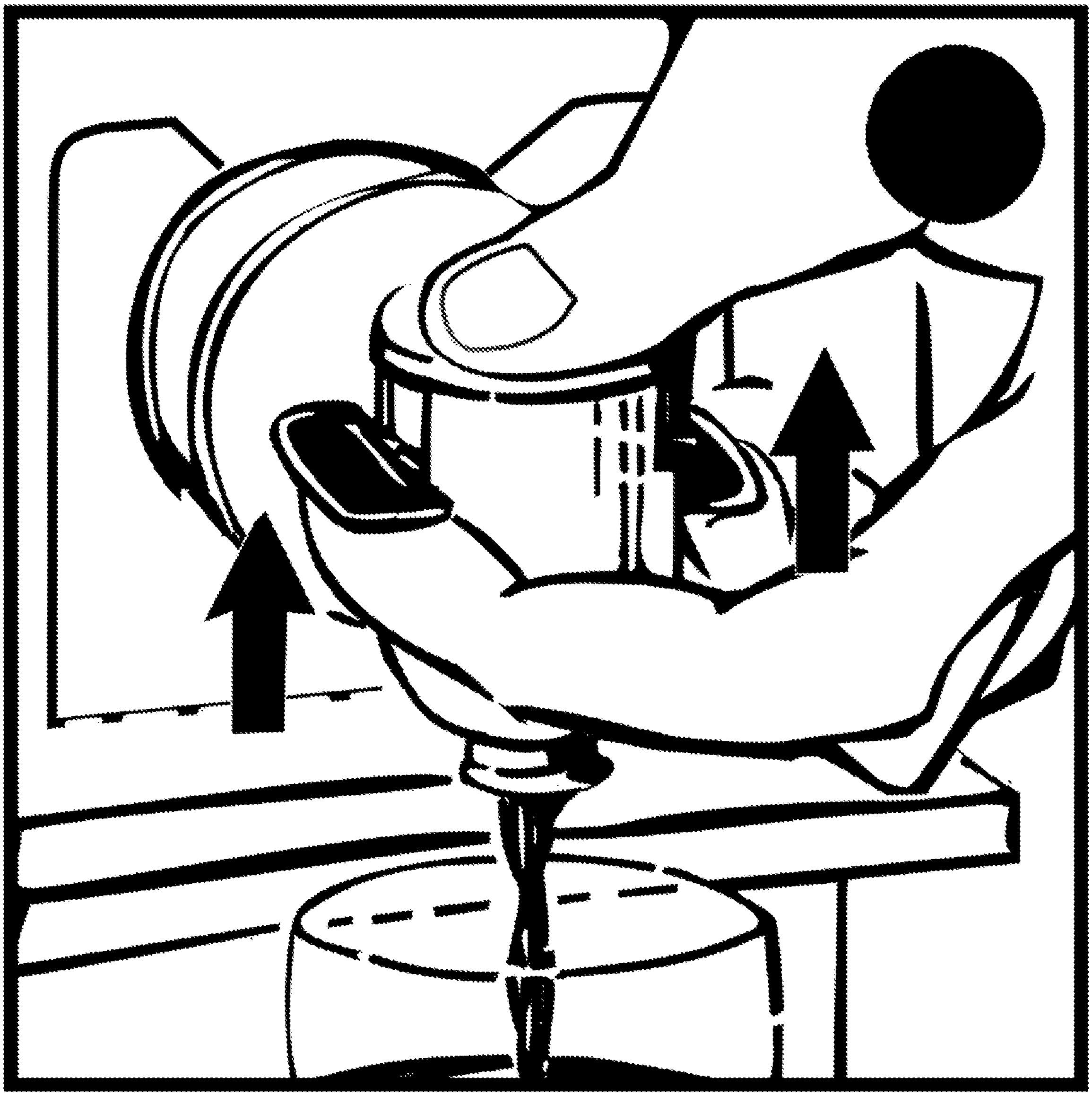
FIG. 35 is a stylized image of the moment of the opening phase (positioning of the fingers on the various components of the tap) of the tap currently on the market after having removed and disposed of the tamper-evident band.

Back part, there is a disc 4.11 of FIG. 30 useful for bag production machines (not shown) and for filling machines (not shown) to have a gripping area (if the cap is being removed to fill the bag: fluid filling phase of the bags on the filler) and/or pushing machines (if you are filling the bag full of fluid or if you are positioning the tap on the bag just produced but still to be filled in the pre-assembly position: pre-assembly phase in the removable position in the bag manufacturing phase) of the tap. Frontally, in the part 4 FRONT of FIG. 30 there is a cylinder 4.2, inside which the internal sealing wall 4.4 and the internal sealing area 4.7 of FIG. 30 are obtained, useful for going into sealing coupling (5.1-4.4) and (5.3-4.7) with the membrane 5 of FIG. 31, which are coupled with the sealing circumference 5.1 and the vertical sealing wall 5.3 of the internal valve or elastic dome membrane 5 of FIG. 31. The seats are also obtained on the front cylinder 4.8 which act as a guide for the sliding and seat of the driving projection 3.4 of FIG. 32. The front and rear slots 4.1 of the front cylinder 4 FRONT are obtained on this body 4 of FIG. 30, in order to create the coupling seats of the teeth obtained inside the cap 2, due to the geometries 2.5 of FIG. 33 (and also of the cap 2B). The body 4 of FIG. 30 can also be used for the traditional methods of connection with the second cap 2A of FIG. 28, namely ultrasonic welding and laser welding, thus underlining its extreme ductility to adapt to any version of the cap. While the compact body version 4 is shown here, it is obviously easy to bring the same geometries also to the traditional body 4A of FIG. 29;

an internal valve or elastic dome membrane 5 of FIG. 31 (in common for all versions) comprising a coupling area 5.4 inside the component, as shown in FIG. 31, a sealing cavity 5.1 and a vertical sealing wall 5.3, which are operatively coupled, sealing the fluids with the internal geometries of the body 4. The special dome geometry and the material used allow the particular internal valve or elastic dome membrane 5 of FIG. 31 to be elastic, and give to the tap assembly 1, 1B the particular self-closing characteristic of the valve 5, once the external mechanical force applied by the user to the external fins of the operating element 3 of FIG. 32 has been eliminated;

a driving element 3 of FIG. 32 which has the particularity of maintaining all characteristics of the first element 3A used today for the tap in production, but with the addition (and therefore only a simple modification that will allow the component to adapt to the new tap configuration 1 of FIGS. 1 and 1B of FIG. 36 by modifying the current production molds) of two planes 3.1 of FIG. 32 on the upper part of the external fins, which allow for the tap version 1 of FIG. 1 to have a flat "contrast" between the seal 2.3 of FIG. 33 and the plane 3.1 of FIG. 32, which, when the seal 2 is closed, prevent the opening of the tap 1 of FIG. 4 and, for the version 1B of FIG. 36, instead guide the flaps/flaps 2B.1 obtained on the second cap 2B (FIG. 36), allowing the automatic opening (and at the same time the breaking of the guarantee seal) of the tap 1B of FIG. 36. There are also hooking geometries 3.2 at the ends, useful for fasten to the valve 5 by means of the coupling geometry 5.4 of FIG. 31 and to the external fins 3.3 of FIG. 32, useful for guaranteeing finger gripping areas in order to allow the tap to open, as shown in FIG. 35. There are also guide and sliding geometries 3.5 in coupling with the geometries 4.8 of the body 4 of FIG. 30;

a cap 2 (better shown in FIG. 33), with movable seal 2.1 of FIG. 33 with automatic opening stably bound to the fixed main body 2.13 due to the hinges 2.2 of FIG. 33 and the jumpers/teeth 2.8 of FIG. 33, forming a single component indivisible, as required by the new European and international directive on single-use plastic articles (SUP). The cap 2 is provided with an internal system with hooking teeth 2.5, which are then stably coupled to the two hollow geometries 4.1 of FIG. 30 obtained on the main universal body 4. The two hooking teeth 2.5 of FIG. 33 have been obtained on the two internal fins 2.10 of FIG. 33, which have the purpose of keeping the membrane 5 of FIG. 31 in the correct position inside the body 4 of FIG. 30 once assembled, due to the cooperation of the plane 5.5 of FIG. 31 with the plane of the fins 2.11 of FIG. 33. The fins 2.10 of FIG. 33 of the new cap also have inside them two tracks 2.7 (a front pair and a rear pair) which guide the driving element 3 of FIG. 32 due to the cooperation of the protruding geometries 3.4 of FIG. 32 and the sliding rails 2.7 of FIG. 33. The front outer part of the cap 2 of FIG. 33 has a gripping tab 2.12. The front part of the seal 2.1 is bound to the main central part 2.13 of the cap 2 due to the two side hinges 2.2, which have the purpose of binding the seal 2.1 to the main body 2.13, preventing it from being dispersed into the environment, as required by the new directives and complies with the new European and international directives on disposable plastic items (SUP), and thus ensuring that it remains bound to tap 1 after opening and does not disperse into the environment, or is disposed of incorrectly, allowing for proper recycling. In addition, the hinges 2.2 allow the opening of the seal, as shown on FIGS. 9, 10, 11, 12, 13 and 14, and therefore in practice they are the flexible and "anchoring" element of the movable part of the new guarantee seal. The integrated seal system remains anchored to the second cap 2 of FIG. 33, which in turn is stably bound to the first body 4. Referring to FIG. 33, it is possible to highlight the characteristics of the new cap 2 with the tamper-evident teeth 2.8 which they give evidence of breakage of the seal 2.1 to the final customer, and act as a guarantee seal when the tap 1 is still closed and sealed, before the first opening. The movable part that overturns at 270°, as shown in FIG. 15, once the tap 1 is completely open, has two stiffening ribs 2.14 inside it, which also have the purpose of "supporting" the front geometry, resting on the front cylinder 4.4 of FIG. 30 of the body 4 during storage, preventing the movable tilting part of the seal 2.1 from deforming, compromising its function. Inside, the movable part of the seal 2.1 will have an anchoring tooth 2.9 which hooks firmly to the tooth 2.4 of FIG. 33, blocking its overturning and giving further evidence of the first opening, as shown in FIG. 15. Elements can also be obtained "thin" connecting jumpers 2.8, which bind the movable front flap of the cap 2 to the main body 2.13. These connecting jumpers 2.8 break upon first opening, due to the thrust of the front seal 2.1 which can be moved during the overturning operation, and guarantee immediate visual feedback for the end customer (together with the final state of the tap in which you can also see the seal 2.1 anchored by means of the hooks 2.4-2.9, as shown in FIG. 15) which understands that the tap 1 has already been opened, avoiding dangerous counterfeits for the final consumer.

The cap 2B, in the version to be used with the universal body 4 of FIG. 30, is shaped like the cap 2 of FIG. 33, in order to be able to adapt to the new anchoring geometries of the universal body 4, while maintaining all its operating characteristics. With reference to FIG. 39, there is therefore a toothed interlocking system 2B.5 between the second body 4 and the cap 2B, and it is obtained like the cap 2 of FIG. 33 on the two internal fins 2B.10. The teeth 2B.5 fit into the seats/slots/holes 4.1 of the universal body 4.

Figure 47:
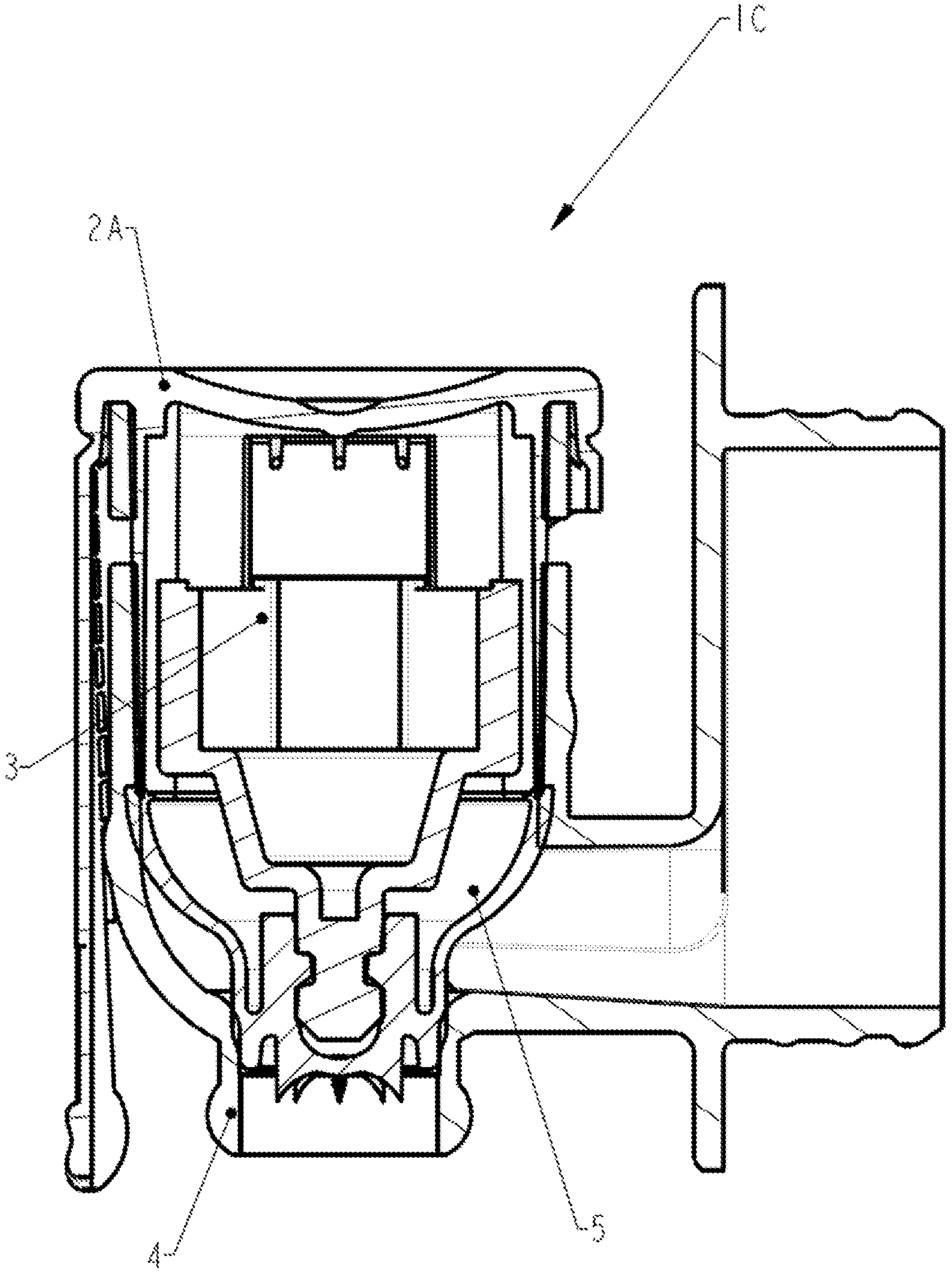
FIG. 47 is a sectional side view of the inventive tap 1C with the cap currently on the market adapted to the body 4 of FIG. 30.

The preferred embodiments of the invention have been described, i.e. mainly the interlocking versions, but this does not limit the operational scope of the present invention, as this invention can be extended, with the relative modifications, also to the versions which exploit the existing welding technologies between two components (as shown for example, and for information only, in FIG. 47, where the universal main body 4 is welded to the cap 2A currently produced, due to ultrasonic welding technology). In this case, the new versions of cap 2 and 2B, appropriately modified, can also be used, even with the currently used welding technology between the two components and therefore not with the joint.

In summary, a new inventive solution has been described, which provides for the use of the new cap 2 of FIG. 33 with a guarantee seal bound to manual opening with a “flap” system and hooking on the rear geometry present on the cap itself, unlike the known cap, which provides for the use of a cap with a binding guarantee seal with automatic opening).

Figure 5:
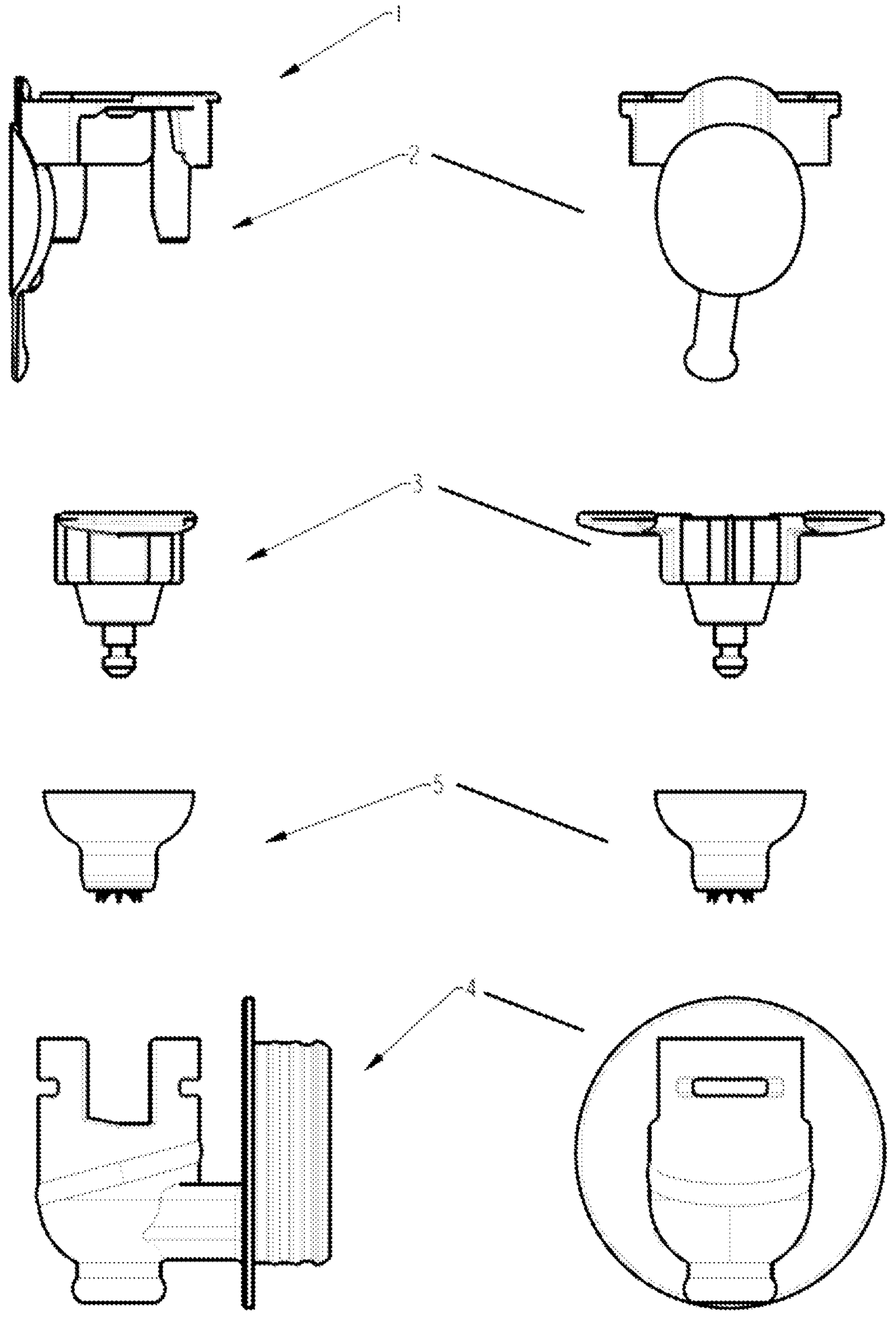
FIG. 5 is an exploded side and front view of an embodiment of the tap.
Figure 6:
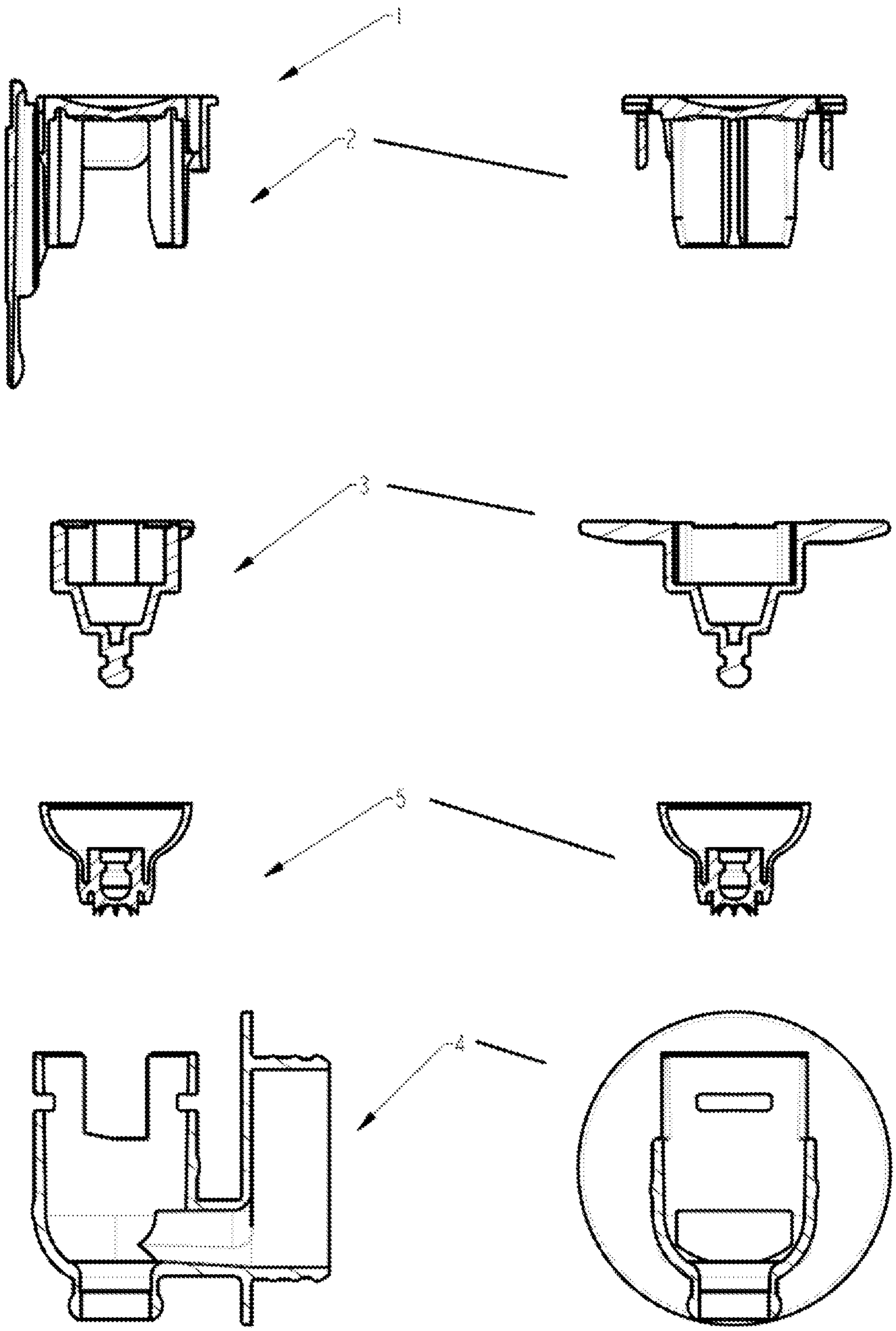
FIG. 6 is an exploded sectional front and side view of an embodiment of the tap according to the present invention.
Figure 7:
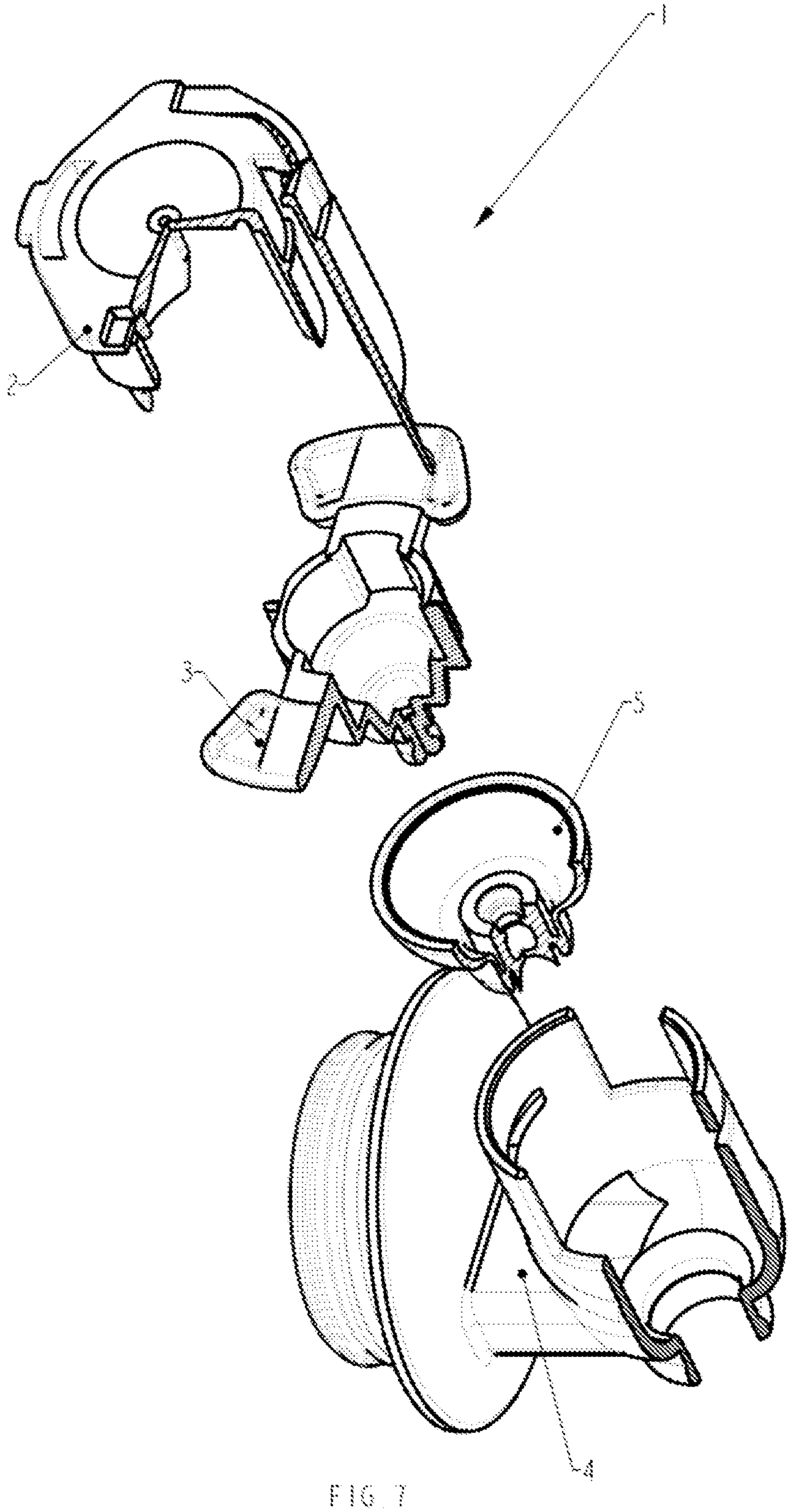
FIG. 7 is an exploded isometric sectional view of an embodiment of the tap according to the present invention.
Figure 8:
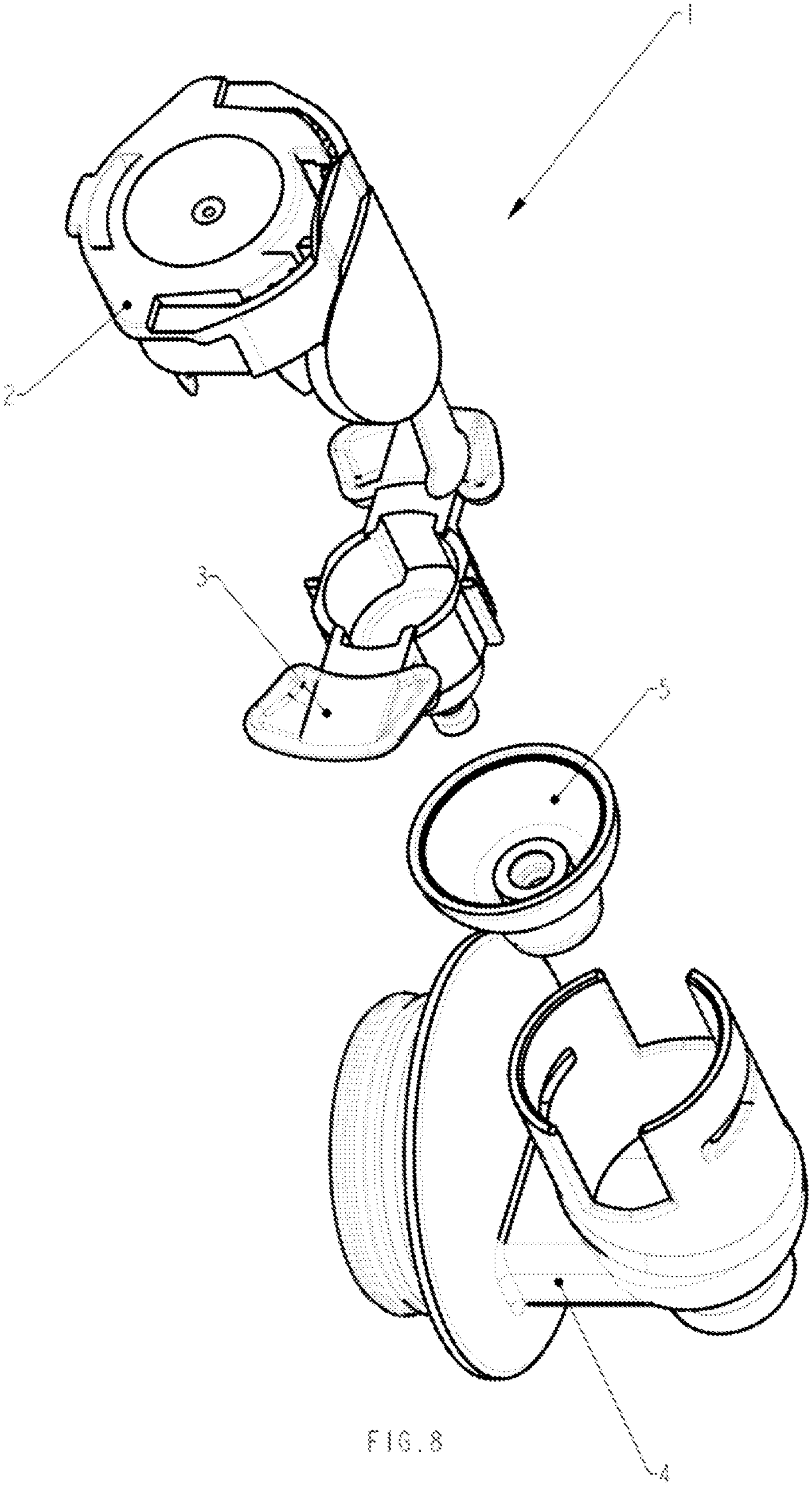
FIG. 8 is an exploded isometric view of the tap according to the present invention.

As shown in FIG. 5, the inventive new faucet consists of four components. A main body 4, on which the geometries necessary for anchoring the cap 2 and the sealing geometries 4.6 to the fluids on the back and anti-counterfeiting locking 4.5 are created, which are coupled with the relative sealing and locking geometries present on the nozzle present on the Bags of the BIB system (not shown) and internally, referring to FIG. 6, on the front cylinder 4.4, the sealing geometries 4.2 and 4.7 which are hermetically coupled with the sealing geometries (static 4.2 and dynamic 4.7) present on membrane 5 in points 5.1 and 5.3. Firmly bound due to the coupling 3.2 of FIG. 6 on the geometry 5.4, there is the operating element 3 which has the function of allowing the opening of the flexible dome valve 5 due to the action of the end user, as shown in FIG. 36. The operating element also has the important function of cooperating with the geometries 2.3 of FIG. 6 (which go against the surface 3.1 obtained on the operating element 3) and avoiding accidental opening of the tap 1 of FIG. 1 when the cap seal 2 is still untouched. Finally, the cap 2 of FIG. 6 is stably and immovably bound to the body 4 due to the simultaneous cooperation (interlocking) of the geometries 2.5, which are stably anchored in the slots 4.1 of the body 4, creating a complete and non-complete tap assembly 1 of FIG. 1, which is more divisible, as required by the new Single Use Plastics (SUP) regulations, and, for example, California AB 319 regulation in the United States. Both regulations aim to increase the amount of plastic collected and recycled, thereby reducing marine litter.

Referring to FIG. 1, it is possible to see the tap with the new seal/cap 2 in its closed position and with the guarantee seal intact. The teeth 2.8 are intact, the tip-up seal part is in its closed position and keeps the tabs 3 stationary in its closed position due to the action of the two planes 3.1 obtained on the operating element 3 with the geometry 2.3 obtained on the cap 2.

Figure 9:
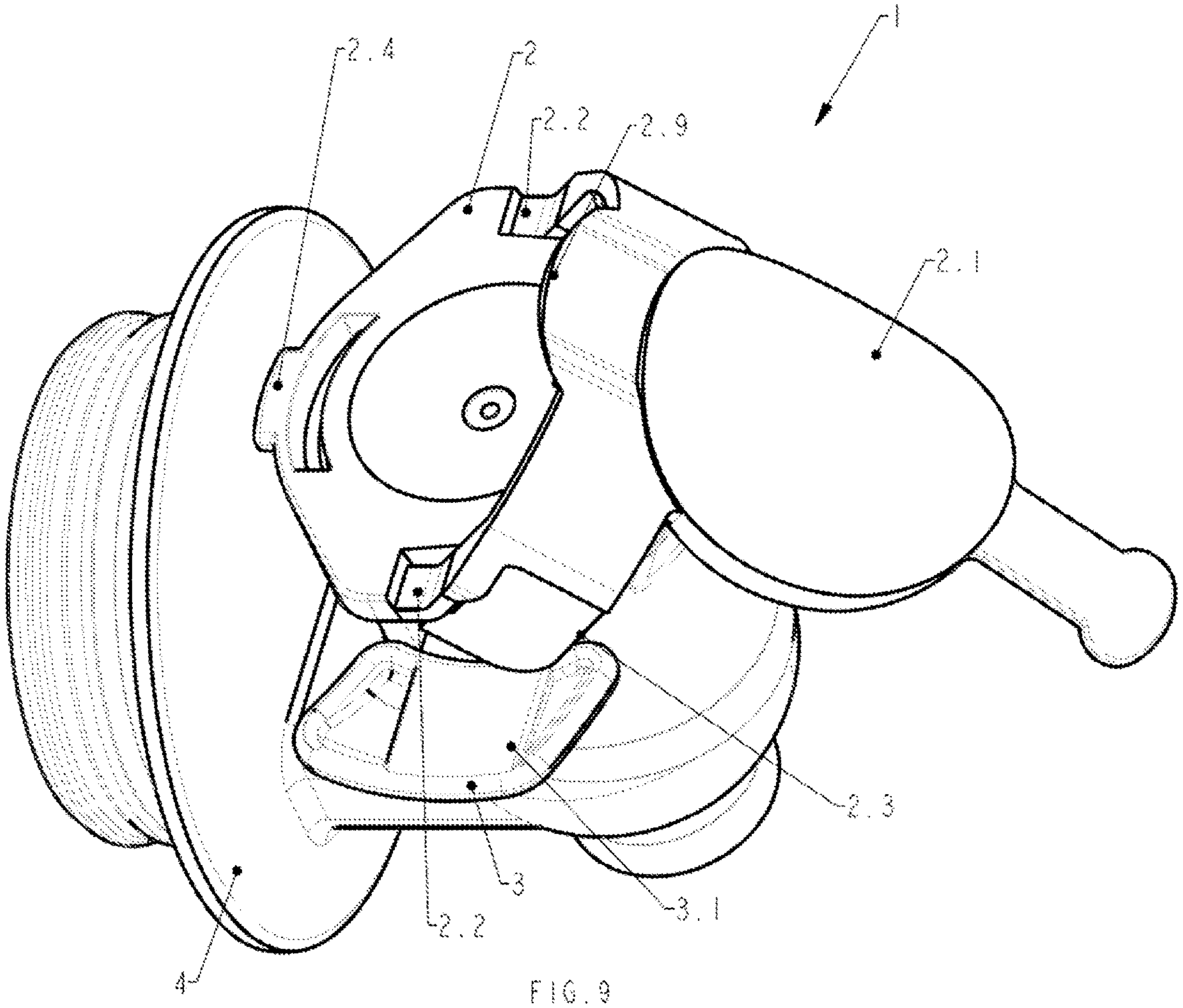
FIG. 9 is an isometric view of the tap in the first opening phase (opening at 50%) according to the present invention.
Figure 10:
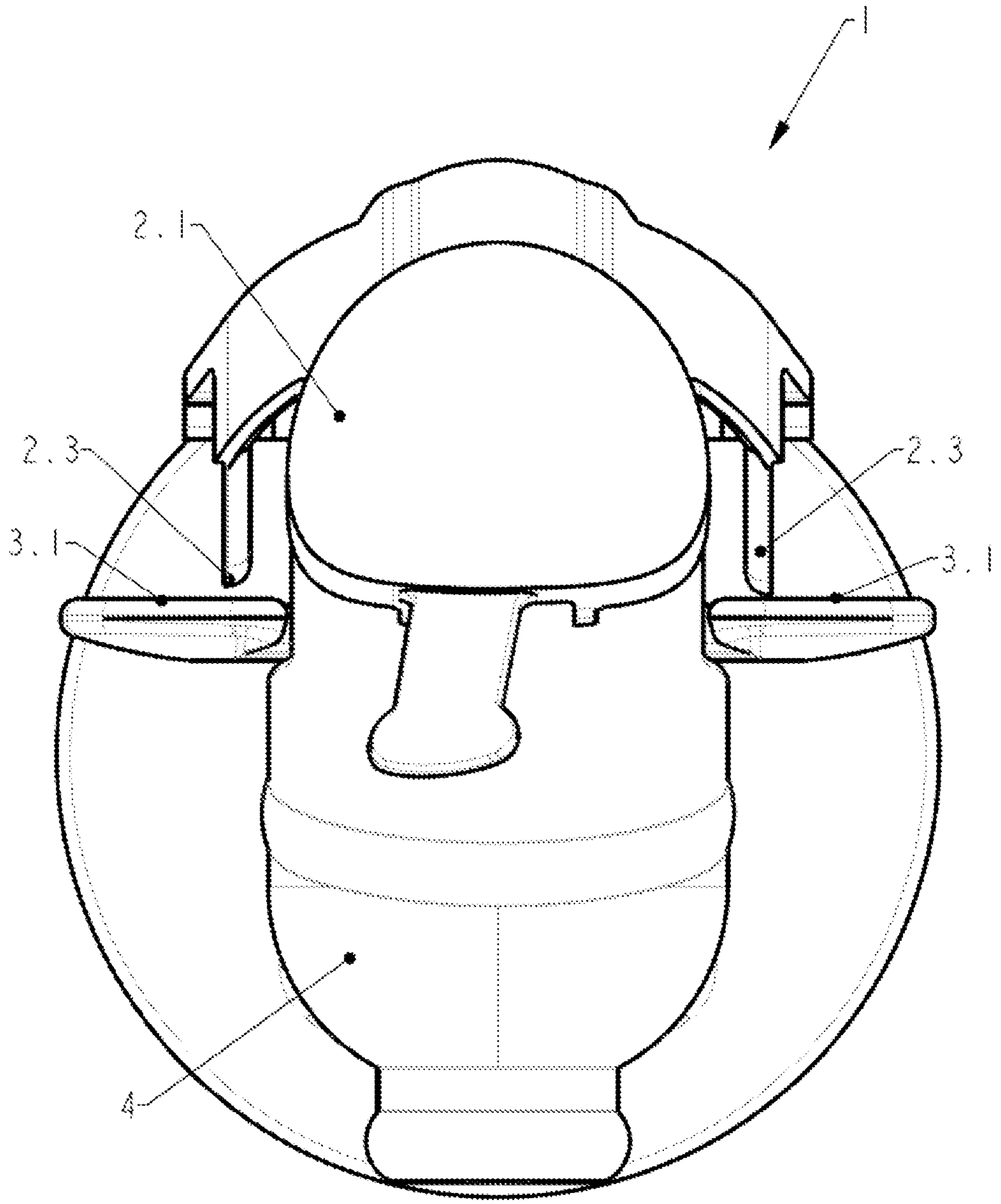
FIG. 10 is a front view of the tap in the first opening phase (opening at 50%) according to the present invention.
Figure 11:
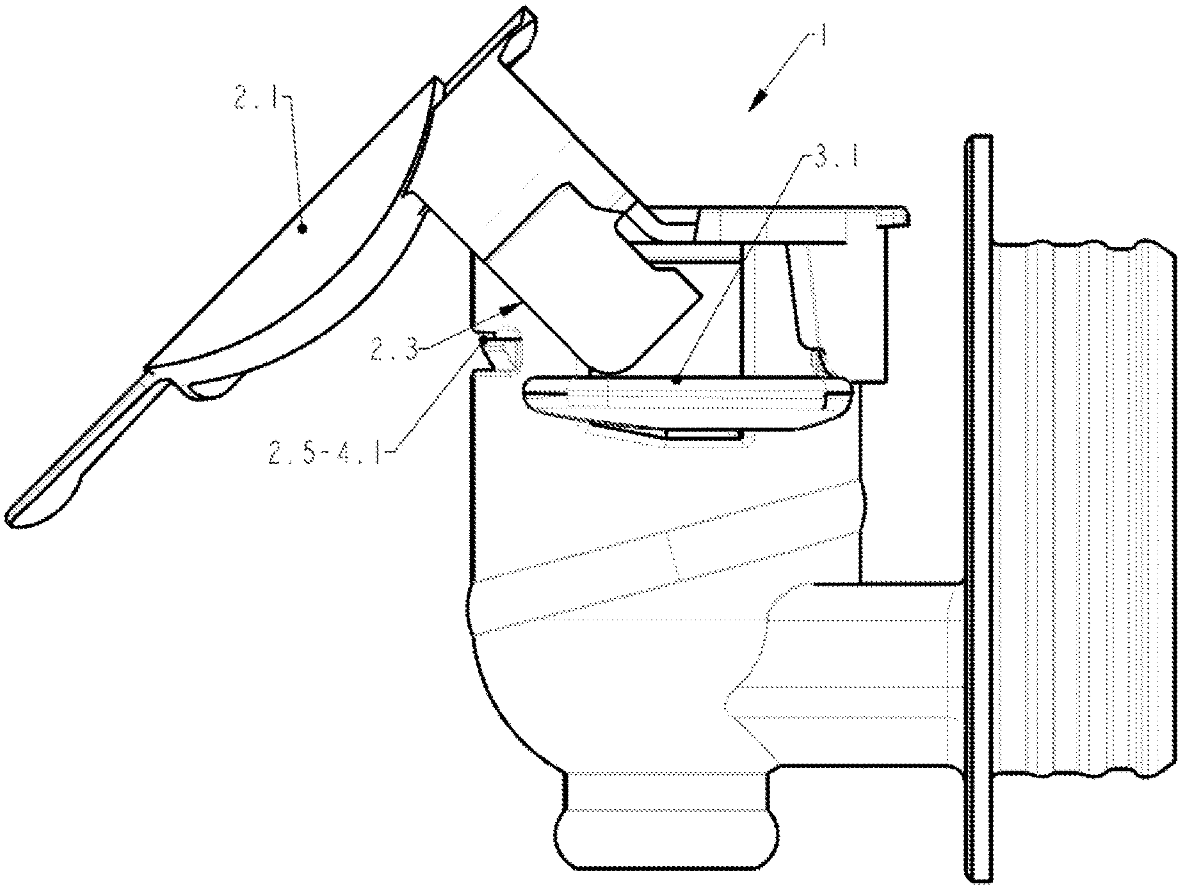
FIG. 11 is a side view of the tap in the first opening phase (opening at 50%) according to the present invention.
Figure 13:
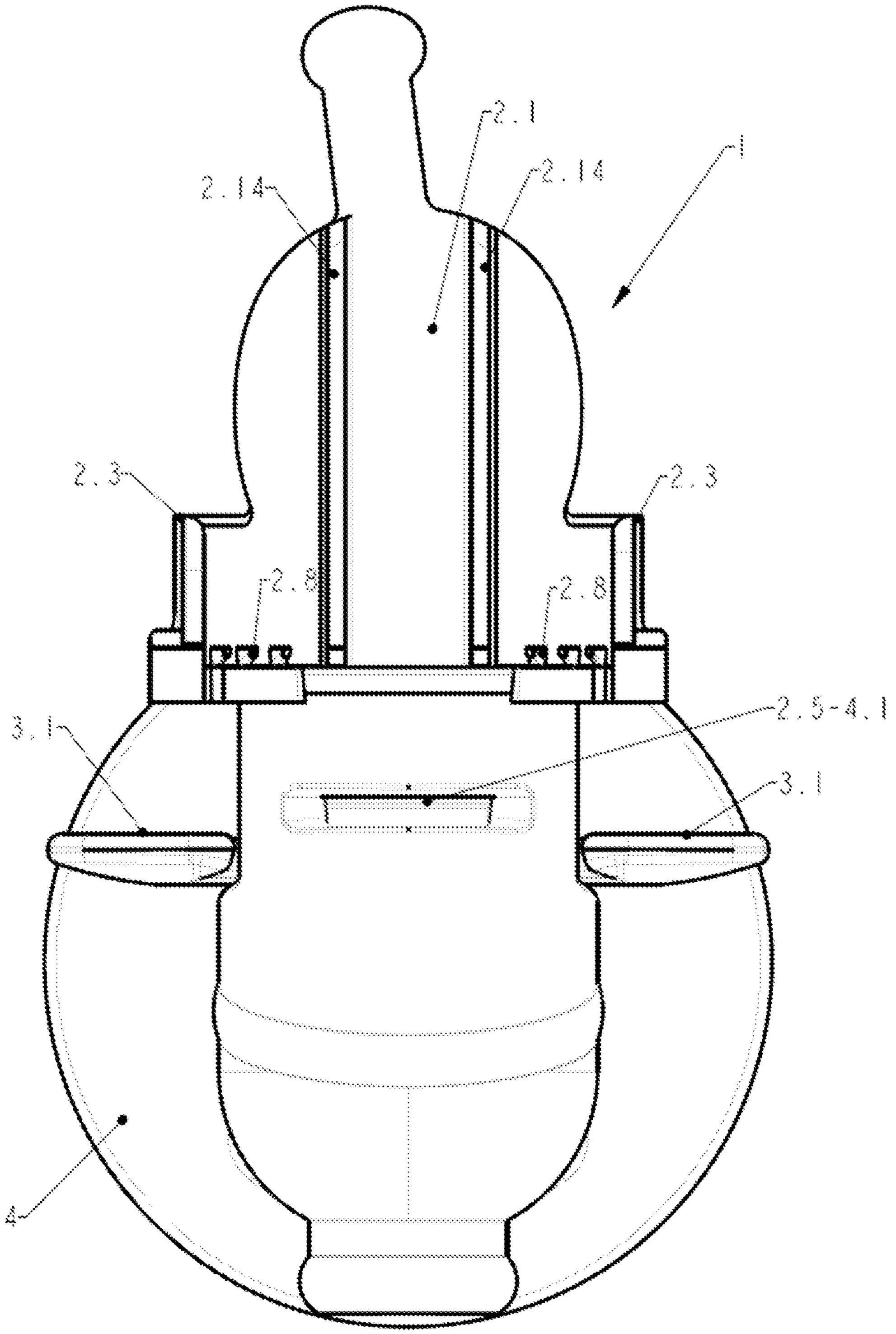
FIG. 13 is a front view of the tap in complete opening (opening at 100%) according to the present invention.
Figure 14:
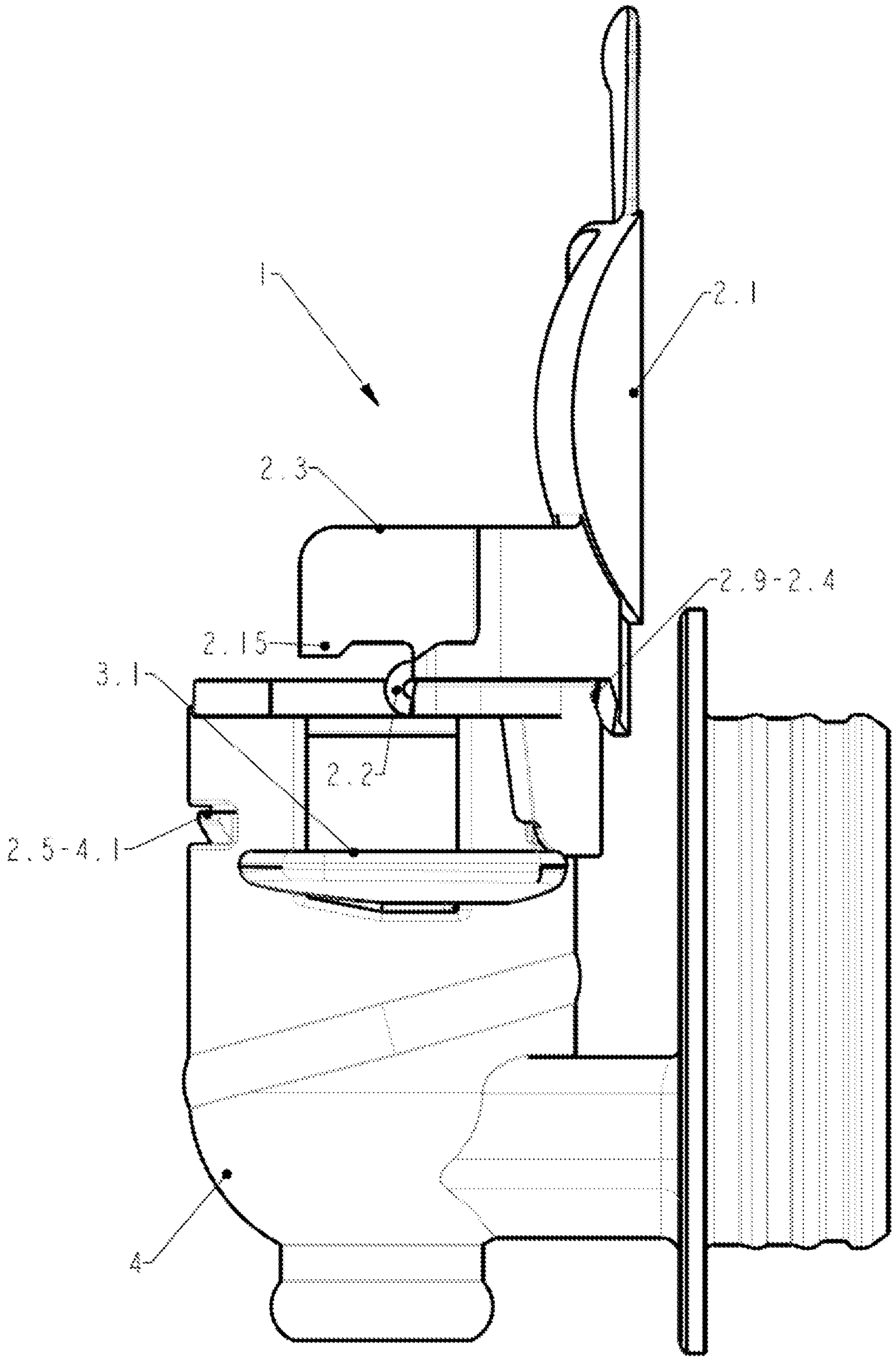
FIG. 14 is a side view of the tap in complete opening (100% opening) according to the present invention.

Referring to FIGS. 9, 10, 11, it is possible to see the guarantee seal at the beginning of its opening phase (controlled by the action that the user performs on the movable part of the seal 2.1 of FIG. 9 and by inducing the movable part of the seal to perform a rotation that has the hinge in the area of the two flexible hinges 2.2 of FIG. 9 and allows at first to break the connecting teeth between the movable part of the seal 2.1 of FIG. 33 and the fixed one 2.13 of FIG. 33. It can also be noted that the two geometries 3.1 and 2.3 that hold the driving element 3 still, with reference to FIG. 9, have detached even if they are not yet completely released. At this stage, it is not yet possible easily dispense liquid. The seal opening phase continues on FIGS. 12, 13, 14: in this case, the overturning of the movable part of the seal by 270° is completed due to the manual action of the end user and the same movable part of the seal 2.1 goes to firmly bond, due to the hooking tooth obtained on the mobile part 2.9 of FIG. 33, to the tooth 2.4 created at the rear, again on the cap 2 of FIG. 33. In this case, the tap 1 is in the position of complete opening and fixing, and allows the free movement of the operating element 3 and the consequent possibility for the final user to dispense the liquid, preferably but not limitedly by the BIB systems. In addition, the tap in the fully open position shown in FIGS. 12, 13, 14 is further evidence of opening for the customer (in this way it is also an additional anti-counterfeiting system and highlights the first opening of the customer).

The movable seal 2.1 in FIG. 33 will thus be bound to tap 1 and will not be dispersed into the environment, as required by the new directives in terms of recycling.

The great advantage is that it does not require a change in the habit of opening and using the application compared to the solution 1A currently on the market in FIG. 15, and therefore it will be much easier to put it on the market and get it to be accepted by end consumers. Furthermore, the aesthetic shape of the new hood unequivocally recalls the one currently on the market, not creating confusion in the final customer.

Furthermore, the manual opening system will remain operational, as in the present technology on the market, only in this case there is the enormous advantage of complying with the new “Disposable Plastic” regulations (SUP) and, for example, the California AB 319 Regulation in the United States. Both regulations have the objective of increasing the amount of plastic collected and recycled, consequently reducing marine litter, which cannot happen with the current technology 1A of FIG. 15 which provides for the removal of the tamper-evident band.

Taking into consideration FIGS. 36 to 42, the self-opening cap 2B is shown, adapted to the new geometry of the universal body 4. The anchoring teeth 2B.5 are made on the internal fins 2.10 and are then operationally coupled with the body 4 of FIG. 30 as shown in FIG. 39. Inside the two fins 2B.10 of FIG. 42 there are the track geometries 2B.7, which guide the sliding of the operating element 3 of FIG. 32 in coupling with the rear and front guides 3.4. The plane 3.1 obtained on the driving element 3 enables the automatic opening of the flaps of the guarantee seal of the cap 2B (2B.1) sliding on the flat surface.

According to the invention, therefore, a liquid dispensing tap 1, 1B, 1C is provided substantially comprising:

a containment body 4;

an internal valve or elastic dome membrane 5 contained within the body 4;

a driving element 3 partially contained within the body 4 and operatively coupled to the internal valve or membrane 5 to enable/disable a supply of liquid from the tap 1, 1B, 1C; and a cap 2 placed above the body 4 to cover the tap 1, 1B, 1C, the cap 2 being composed of a fixed main body 2.13 equipped with a movable seal 2.1 with automatic opening stably bound to the fixed main body 2.13 due to hinges 2.2 and jumpers 2.8.

The invention claimed is:

1. A liquid dispensing tap comprising:

a containment body;

an internal valve or elastic dome membrane contained within said body;

a driving element partially contained within said body and operatively coupled to said internal valve or membrane to enable/disable a delivery of liquid from said tap; and a cap placed above said body to cover said tap, said cap being composed of a main body equipped with a movable seal with automatic opening stably bound to said fixed main body due to hinges and jumpers/teeth;

characterized in that said cap is provided with an internal system with hooking teeth, designed to be stably coupled to two hollow geometries of said body, said two hooking teeth being formed on two internal fins designed to keep said internal valve or membrane in the correct position inside said body once assembled, due to the cooperation of a plane of said internal valve or membrane with the plane of the fins; and in that the front outer part of the cap has a grip tab, while the front part of the seal is bound to the main central part of the cap due to the two side hinges designed to bind the seal to the main body, preventing it from dispersing into the environment, or being disposed of incorrectly, said hinges allowing the opening of the seal, and constituting a flexible and anchoring element of the movable part, said teeth/jumpers (2.8) giving evidence of breakage of the seal and operating as a guarantee seal when the tap is still closed and sealed, before the first opening, said movable part overturning at 270°, once the tap is completely open and having inside it two stiffening ribs, designed to rest on the front cylinder of the body, avoiding that the movable part of the seal is deformed, the movable part of the seal having an anchoring tooth which hooks firmly to the tooth, blocking its overturning and giving further evidence of the first opening.

2. The delivery tap according to claim 1, characterized in that said body is equipped with a front end with front cylinder and an elongated end formed by a cylinder, placed perpendicular to the front cylinder, on the elongated cylinder being obtained geometries necessary to obtain a connection and liquid seal element on a connection nozzle, and an anti-removal and anti-counterfeiting connecting element, between the front end and the elongated end a disk being obtained, designed to have a gripping area and/or thrust, said front cylinder containing inside it an internal sealing wall and an internal sealing area designed to go into sealing coupling with said internal valve or membrane through a respective coupling with a sealing cavity/circumference and a vertical sealing wall with which said internal valve or membrane is equipped.

3. The dispensing tap according to claim 2, characterized in that seats are also obtained on said front cylinder which act as a guide for sliding and seat of a driving projection of said operating element, on said body the front and rear slots of the front cylinder being also obtained, in order to create seats for hooking teeth obtained inside said cap.

4. The delivery tap according to claim 1, characterized in that said internal valve or elastic dome membrane comprises an internal coupling area, said sealing circumference/cavity and said vertical sealing wall, designed to be operatively coupled by sealing the fluids with the internal geometries of said body, the special dome geometry and the material used allowing said internal valve or elastic dome membrane to be elastic and provide the self-closing characteristic of the valve, once the external mechanical force applied by the user to the external fins of said operating element has been eliminated.

5. The delivery tap according to claim 4, characterized in that said operating element is equipped with external fins comprising two planes on their upper part, said planes allowing to have a flat contrast between a seal of said cap and said plane, said operating element being also equipped with coupling geometries at the ends, designed to be constrained on said valve by means of the coupling geometry, and external fins, designed to ensure finger gripping areas in order to allow the tap to open, said operating element being also equipped with guiding and sliding geometries in coupling with geometries of said body.

6. The delivery tap according to claim 1, characterized in that said fins also have inside them two tracks, a front pair and a rear pair, which guide the driving element due to their cooperation with the protruding geometries of said driving element.

7. The delivery tap according to claim 1, characterized in that said cap is equipped with a toothed interlocking system between the body and the cap, obtained on the two internal fins, said teeth going to fit into the seats/slots/holes of said body.

* * * * *